(12) United States Patent
Doumaux et al.

(10) Patent No.: US 11,035,075 B2
(45) Date of Patent: *Jun. 15, 2021

(54) THERMAL INKJET DYE SUBLIMATION INKS

(71) Applicant: Hewlett-Packard Development Company, L.P., Spring, TX (US)

(72) Inventors: Howard Doumaux, San Diego, CA (US); Nicholas J. Stewart, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/648,440

(22) PCT Filed: Nov. 8, 2017

(86) PCT No.: PCT/US2017/060689
§ 371 (c)(1),
(2) Date: Mar. 18, 2020

(87) PCT Pub. No.: WO2019/094010
PCT Pub. Date: May 16, 2019

(65) Prior Publication Data
US 2020/0283952 A1    Sep. 10, 2020

(51) Int. Cl.
*D06P 5/00* (2006.01)
*D06P 5/28* (2006.01)
(Continued)

(52) U.S. Cl.
CPC ............. *D06P 5/006* (2013.01); *C08K 5/053* (2013.01); *C08K 5/175* (2013.01); *C08K 5/52* (2013.01);
(Continued)

(58) Field of Classification Search
CPC .. D06P 5/006; D06P 5/004; D06P 5/30; D06P 1/16; D06P 1/908; D06P 3/54;
(Continued)

(56) References Cited

U.S. PATENT DOCUMENTS 5,707,925 A    1/1998  Akada et al.
8,360,569 B2   1/2013  Chen et al.
(Continued)

FOREIGN PATENT DOCUMENTS

CN    101245204 A    8/2008
CN    102212287 B    10/2013
(Continued)

OTHER PUBLICATIONS

Milmo, S., "High-end Textile Ink Market is Growing in Europe",Nov. 27, 2013, https://www.inkworldmagazine.com/issues/2013-11/view_features/high-end-textile-ink-market-is-growing-in-Europe/.

*Primary Examiner* — Eisa B Elhilo
(74) *Attorney, Agent, or Firm* — Dierker & Kavanaugh PC

(57) ABSTRACT

A thermal inkjet dye sublimation ink consists of a disperse dye colorant dispersion, a co-solvent system, an additive, and a balance of water. The colorant dispersion is present in an amount ranging from about 1 wt % actives to about 7 wt % actives. The co-solvent system is present in a total amount ranging from about 12 wt % to about 25 wt %. The co-solvent system consists of glycerol present in an amount ranging from about 9 wt % to about 16 wt %, ethoxylated glycerol present in an amount ranging from 0 wt % to about 5 wt %, and a water soluble or water miscible organic solvent present in an amount ranging from 0 wt % to about 7 wt %. The additive is selected from the group consisting of a surfactant, a chelating agent, a buffer, a biocide, and combinations thereof.

15 Claims, 15 Drawing Sheets

(51) Int. Cl.
  *C08K 5/053* (2006.01)
  *C08K 5/17* (2006.01)
  *C08K 5/52* (2006.01)
  *C09D 11/324* (2014.01)
  *C09D 11/328* (2014.01)
  *C09D 11/38* (2014.01)
  *C09D 17/00* (2006.01)
  *D06P 5/30* (2006.01)

(52) U.S. Cl.
  CPC .......... *C09D 11/324* (2013.01); *C09D 11/328* (2013.01); *C09D 11/38* (2013.01); *C09D 17/001* (2013.01); *C09D 17/005* (2013.01); *D06P 5/30* (2013.01)

(58) Field of Classification Search
  CPC ...... D06P 1/65118; D06P 3/26; C09D 11/328; C09D 11/30; C09D 11/324; C09D 17/001; C09D 17/005
  USPC ............................................ 8/471; 106/31.13
  See application file for complete search history.

(56) References Cited

U.S. PATENT DOCUMENTS

| | | | |
|---|---|---|---|
| 8,936,358 | B2 | 1/2015 | Sao et al. |
| 9,040,623 | B2 | 5/2015 | Akatani et al. |
| 9,109,327 | B2 | 8/2015 | Mizutaki |
| 9,340,694 | B2 | 5/2016 | Oura et al. |
| 9,428,658 | B2 | 8/2016 | Hofstra et al. |
| 9,534,128 | B2 | 1/2017 | Oguchi et al. |
| 9,758,687 | B2 | 9/2017 | Mheidle |
| 2008/0070009 | A1* | 3/2008 | Akatani ................ C09D 11/38 428/195.1 |
| 2009/0113641 | A1* | 5/2009 | Akatani ................ D06P 1/6138 8/552 |
| 2012/0162332 | A1* | 6/2012 | McKean ................ C09D 11/40 347/100 |

FOREIGN PATENT DOCUMENTS

| | | |
|---|---|---|
| CN | 103450740 B | 7/2015 |
| CN | 106835778 A | 6/2017 |

* cited by examiner

100 ─╲

┌─────────────────────────────────────────────────────────────────────┐
│ Selecting a Dye Sublimation Ink, Including:                         │
│                                                                     │
│   A Disperse Dye Colorant Dispersion Present in an Amount Ranging from about 1 wt% Actives │
│   to about 7 wt% Actives Based on a Total Weight of the Ink;        │
│                                                                     │
│   A Co-Solvent System Present in a Total Amount Ranging from about 12 wt% to about 25 wt%  │
│   Based on the Total Weight of the Ink, the Co-Solvent system Consisting of:               │
│                                                                     │
│   Glycerol Present in an Amount Ranging from about 9 wt% to about 16 wt% Based on the      │
│   Total Weight of the Ink;                                          │
│                                                                     │
│   Ethoxylated Glycerol Present in an Amount Ranging from 0 wt% to about 5 wt% Based On the │
│   Total Weight of the Ink; and                                      │
│                                                                     │
│   A Water Soluble or Water Miscible Organic Solvent Present in an Amount Ranging from 0 wt%│
│   to about 7 wt% Based on the Total Weight of the Ink;              │
│                                                                     │
│   An Additive Selected from the Group Consisting of a Surfactant, a Chelating Agent, a Buffer, │
│   a Biocide, and Combinations thereof; and                          │
│                                                                     │
│   A Balance of Water                                                │
└─────────────────────────────────────────────────────────────────────┘ ─── 102

┌─────────────────────────────────────────────────────────────────────┐
│ Applying to a Heating Resistor of a Thermal Inkjet Printhead an Operating Energy that Includes │
│ a Margin Over a Turn-On Energy (TOE) for the Printhead, wherein the Margin Ranges from │
│ about 10% to about 25% over the TOE                                │
└─────────────────────────────────────────────────────────────────────┘ ─── 104

┌───────────────────────────────────┐         ┌───────────────────────────────────────┐
│ Thermal Inkjet Printing, From the Thermal │         │ Thermal Inkjet Printing, From the Thermal │
│ Inkjet Printhead, the Dye Sublimation │ ─── 106 │ Inkjet Printhead, the Dye Sublimation Ink │ ─── 108
│ Ink Directly Onto a Textile Substrate │         │ Onto a Transfer Medium to Form an Image │
│                                   │         │ On the Transfer Medium                │
└───────────────────────────────────┘         └───────────────────────────────────────┘

┌───────────────────────────────────────┐
                                              │ Transferring the Image from the Transfer │ ─── 110
                                              │ Medium Onto a Textile Substrate       │
                                              └───────────────────────────────────────┘

*Fig-1*

THERMAL INKJET DYE SUBLIMATION INKS

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers, and in particular piezoelectric inkjet printers, are gaining rapid acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a flow diagram illustrating two examples of a printing method;

DETAILED DESCRIPTION

Figure 2:
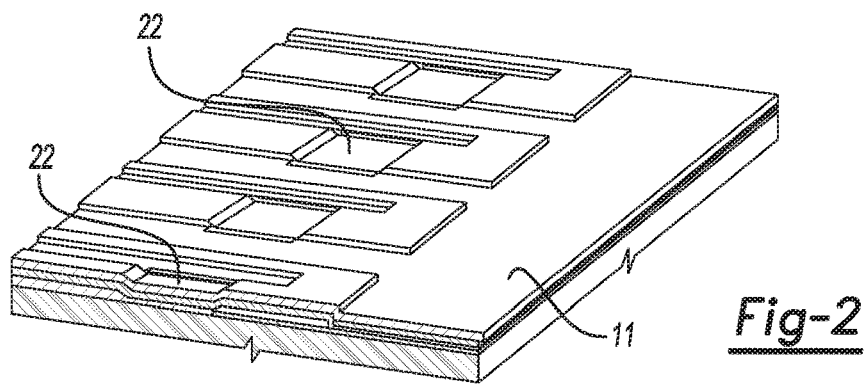
FIG. 2 is a partially cross-sectioned perspective semi-schematic illustration showing an example of heating resistors of an example thermal inkjet printhead.

Examples of the dye sublimation inks disclosed herein are particularly suitable for thermal inkjet printing, in part because they include a relatively low amount of a co-solvent system. The co-solvent system is primarily made up of glycerol, which effectively disperses, rather than dissolves, the disperse dye of the colorant dispersion. The co-solvent system renders the dye sublimation ink jettable via thermal inkjet printheads and also provides substantially consistent print quality (i.e., 25')/c, change in drop velocity and/or change in drop weight, and in some instances 15% change in drop velocity and/or drop weight) over the life of the printhead (e.g., from over 100 million drops per nozzle to 1 billion drops per nozzle). It has been found that the inks disclosed herein can extend the printhead life by two to three orders of magnitude when compared to inks that do not include the specific co-solvent system. This means that better print quality, e.g., prints without banding, missing spaces, and/or misdirected drops, can be achieved for a longer period of time using the inks disclosed herein.

In addition to having improved jettability from a thermal inkjet printhead, it is believed that the dye sublimation inks disclosed herein are particularly suitable for directly forming an image on a textile substrate, such as polyester. The solvent levels used in the inks disclosed herein are relatively low (e.g., 25 wt % or less, and in some instances 16 wt % or less), which is believed to improve the storage ability of the prints formed via the direct printing method disclosed herein. After being printed, sublimed, and re-solidified, some disperse dyes can migrate across the textile substrate or within the fibers of the textile substrate when exposed to high temperature storage conditions (e.g., 38° C.). It is believed that the reduced amount of the solvents in the cyan inks disclosed herein can contribute to a reduced amount of residual solvent in the printed image, which improves dye re-solidification and reduces dye migration during storage.

An example of the thermal inkjet dye sublimation ink disclosed herein consists of a disperse dye colorant dispersion present in an amount ranging from about 1 wt % actives to about 7 wt % actives based on a total weight of the ink; a co-solvent system present in a total amount ranging from about 12 wt % to about 25 wt % based on the total weight of the ink, the co-solvent system consisting of glycerol present in an amount ranging from about 9 wt % to about 16 wt % based on the total weight of the ink, ethoxylated glycerol present in an amount ranging from 0 wt % to about 5 wt % based on the total weight of the ink, and a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and a balance of water. In these examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet printhead may be added.

Throughout this disclosure, a weight percentage that is referred to as "wt % actives" refers to the loading of an active component of a dispersion or other formulation that is present in the thermal inkjet dye sublimation ink. For example, the wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink. The term "wt %," without the term actives, refers to the loading of a 100% active component that does not include other non-active components therein.

In the examples disclosed herein, the disperse dye colorant dispersion may be any color. In an example, the disperse dye colorant dispersion is selected from the group consisting of a black disperse dye colorant dispersion, a cyan disperse dye colorant dispersion, a magenta disperse dye colorant dispersion, and a yellow disperse dye colorant dispersion. Each disperse dye colorant dispersion includes a disperse dye, a dispersant, and a dispersion vehicle.

The disperse dye included in the colorant dispersion may depend on the desired color for the thermal inkjet dye sublimation ink.

Black disperse dye colorant dispersions often include a blend of disperse dyes, such as, for example, blends of blue, brown and yellow disperse dyes, or blends of blue, orange and violet disperse dyes, or blends of blue, orange and yellow disperse dyes, or blue, magenta, and yellow dyes. An example of a suitable blue, brown and yellow disperse dye blend include disperse blue 360 (DB360), disperse brown 27, and disperse yellow 54 (DY54). Some examples of suitable blue, orange and violet disperse dye blends include disperse blue 291:1 (DB291:1), disperse orange 29 (DO29) and disperse violet 63, or DB291:1, DO29 and disperse violet 99. An example of a suitable blue, orange and yellow dye blend includes DB360, disperse orange 25, and DY54. An example of a suitable blue, magenta, and yellow dye blend includes disperse blue 77 (DB77), disperse red 92, and disperse yellow 114 (DY 114).

Cyan disperse dye colorant dispersions may include blue disperse dyes, such as disperse blue 27, disperse blue 60, disperse blue 73, DB77, disperse blue 87, disperse blue 257, DB291:1, disperse blue 359, DB360, disperse blue 367, and mixtures thereof.

Magenta disperse dye colorant dispersions may include red disperse dyes, such as disperse red 60, disperse red 82, disperse red 86, disperse red 86:1, disperse red 167:1, disperse red 279, and mixtures thereof.

Yellow disperse dye colorant dispersions may include yellow disperse dyes, such as DY54, disperse yellow 64, disperse yellow 71, disperse yellow 86, DY114, disperse yellow 153, disperse yellow 233, disperse yellow 245, and mixtures thereof.

The disperse dye colorant dispersion may include from about 10 wt % dye solids to about 20 wt % dye solids based on the total weight of the colorant dispersion.

As mentioned above, each disperse dye colorant dispersion also includes a dispersant. The dispersant may be any suitable polymeric dispersant that can disperse the dye and that can be jetted via a thermal inkjet printhead.

Some examples of the polymeric dispersant (which may also be anionic or non-ionic) include polymers or copolymers of acrylics, methacrylics, acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylam ides, and/or methacrylam ides. Some specific examples include a styrene methacrylic acid copolymer, a styrene acrylic acid copolymer, styrene acrylic acid-acrylic ester copolymers, styrene methacrylic acid-acrylic ester copolymers, a styrene maleic anhydride copolymer, polyacrylic acid partial alkyl ester, polyalkylene polyamine, polyacrylates, and vinyl naphthalene-maleic acid copolymers. Another example of a suitable polymeric dispersant is a polyurethane polymer. Still other examples of suitable polymeric dispersants for the disperse dye colorant dispersion include block acrylic copolymers, including A-B block copolymers such as benzyl methacrylate-methacrylic acid diblock copolymers and butyl methacrylate-methacrylic acid diblock copolymers. Still further examples of suitable polymeric dispersants include ABC triblock copolymers, such as benzyl methacrylate-methacrylic acid-ethoxytriethyleneglycol methacrylate triblock copolymers and butyl methacrylate-methacrylic acid-ethoxytriethyleneglycol methacrylate triblock copolymers. Still some other examples of suitable dispersants include low acid value acrylic resins, such as JONCRYL® 586, 671, 675, 678, 680, 683, 690, 693, and 695 (from BASF Corp.).

Examples of polymerization methods used to form the dispersant may include free radical processes, Group Transfer Processes (GTP), radical addition fragmentation (RAFT), atom transfer reaction (ATR), special chain transfer polymerization technology (SCT), and the like. As one example, the dispersant may be a graft acrylic copolymer made by SCT.

In other examples, the disperse dyes may be self-dispersing dyes. The disperse dyes may be exposed to a diazonium treatment (where a charged free radical from a degraded azo attaches to the colorant), or to an ozone treatment (oxidation and functionalization with, e.g., a carboxylic acid), or to a crosslinking treatment to render the dye self-dispersing.

The disperse dye colorant dispersion may include from about 4 wt % dispersant solids to about 7 wt % dispersant solids, based on the total weight of the colorant dispersion.

The mean particle size of the solids (e.g., the disperse dyes and the dispersants) in the disperse dye colorant dispersion may range from about 50 nm to about 100 nm. In another example, the mean particle size of the disperse dye ranges from about 100 nm to about 200 nm. These particle sizes are particularly suitable for being jetted through the orifices of thermal inkjet printheads.

The dispersion vehicle may include water and a water soluble or water miscible co-solvent. Examples of the water soluble or water miscible co-solvent in the disperse dye colorant dispersion may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone, 1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether.

One or more of these co-solvents may be present in the disperse dye colorant dispersion in respective amounts ranging from about 1 wt % to about 5 wt %, based on the total weight of the colorant dispersion. The balance of the disperse dye colorant dispersion is water, such as purified water or deionized water.

In an example, the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on the total weight of the colorant dispersion. In this example, the remainder of the disperse dye colorant dispersion may be co-solvent(s) and water.

As mentioned above, the specific co-solvent system and the low amount in which it is incorporated in the ink aid in making the dye sublimation ink jettable via thermal inkjet printheads and also result in substantially consistent print quality over the life of the thermal inkjet printhead. As such, disclosed herein is a method for improving thermal inkjet printing performance of a dye sublimation ink, comprising: selecting a co-solvent system including glycerol and ethoxylated glycerol; and incorporating the selected co-solvent system into the dye sublimation ink, including: a disperse dye colorant dispersion present in an amount ranging from about 1 wt % actives to about 7 wt % actives based on a total weight of the ink; a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and water; and wherein the incorporating involves adding the glycerol in an amount ranging from about 9 wt % to about 16 wt % based on the total weight of the ink; and adding the ethoxylated glycerol in an amount ranging from 0 wt % to about 5 wt % based on a total weight of the ink.

To form the thermal inkjet dye sublimation ink disclosed herein, the disperse dye colorant dispersion is incorporated into an ink vehicle, which includes the co-solvent system of glycerol alone or in combination with ethoxylated glycerol, additive(s), and water.

The disperse dye colorant dispersion may be incorporated into the ink vehicle such that from about 1 wt % actives to about 7 wt % actives are present, based on a total weight of the thermal inkjet dye sublimation ink. In another example, the disperse dye colorant dispersion may be present in an amount ranging from about 3 wt % actives to about 5 wt % actives based on the total weight of the thermal inkjet dye sublimation ink. The wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink.

The co-solvent system is present in a total amount ranging from about 12 wt % to about 25 wt % based on the total weight of the ink. The co-solvent system includes glycerol, and in some instances, ethoxylated glycerol.

Glycerol is the primary solvent, in part, because the disperse dye is highly non-soluble in glycerol. Glycerol is also selected, in part, because it also helps to maintain the nozzle health of the thermal inkjet printheads, and to provide substantially consistent print quality over the life of the printhead. The glycerol is present in an amount ranging from about 9 wt % to about 16 wt % based on the total weight of the ink.

Ethoxylated glycerol may also be present in the co-solvent system. In an example, the ethoxylated glycerol is present in an amount ranging from 0 wt % to about 5 wt %. The inclusion of ethoxylated glycerol may improve the turn-on energy curve for the ink, may help the thermal inkjet printhead fire better, and may improve decap performance. In some example inks, such as cyan inks, the print performance may be achieved without including the ethoxylated glycerol.

The co-solvent system may also include the water soluble or water miscible organic solvent present in an amount ranging from 0 wt % to about 7 wt % based on the total weight of the ink. In general, the disperse dye in the disperse dye colorant dispersion is more soluble in the water soluble or water miscible organic solvent than in the glycerol, and thus makes up less than 50% of the total solvent content (i.e., glycerol plus any ethoxylated glycerol plus the water soluble or water miscible organic solvent, and not including water) so that the disperse dyes remain dispersed in the ink vehicle. The water soluble or water miscible organic solvent may be added to the ink vehicle or may be included as the co-solvent from the disperse dye colorant dispersion. As such, in an example, at least a portion of the water soluble or water dispersible in the ink is also present in the disperse dye colorant dispersion (e.g., as the co-solvent of the dispersion). This co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink. Examples of the water soluble or water miscible organic solvent that may be present in the co-solvent system are selected from the group consisting of 2-pyrrolidone, propylene glycol, dipropylene glycol, 1,2-hexanediol, 1,2-propanediol, 1,3-propanediol, 2-methyl-1,3-propanediol, tetrahydrofuran, diethylene glycol, and combinations thereof.

In one example of the co-solvent system in the ink, the glycerol is present in an amount of about 12 wt %, and the ethoxylated glycerol is present in an amount of about 4 wt %. In another example of the co-solvent system in the ink, the glycerol is present in an amount of about 9 wt %, and the ethoxylated glycerol is present in an amount of about 3 wt %. In still another example, the co-solvent system in the ink consists of the glycerol present in an amount ranging from about 12 wt % to about 16 wt % based on the total weight of the ink, and the water soluble or water miscible organic solvent.

Examples of the ink disclosed herein may also include additive(s), such as a surfactant, a chelating agent, a buffer, a biocide, and combinations thereof.

In an example, the total amount of surfactant(s) in the thermal inkjet dye sublimation ink ranges from about 0 wt % to about 2 wt % (with respect to the weight of the thermal inkjet dye sublimation ink). In another example, the surfactant is present in an amount of 1 wt % or less. The surfactant(s) may be included in the thermal inkjet dye sublimation ink to aid in jettability, control the viscosity, to improve the lubricity, and to prevent agglomeration of the dispersed dye solids. Examples of suitable surfactants include oleth-3-phosphate, non-ionic, low foaming surfactants, such as ethoxylated 2,4,7,9-tetramethyl 5 decyn-4,7-diol (commercially available as SURFYNOL® 465 (HLB 13) from Evonik Industries) and other ethoxylated surfactants (commercially available as SURFYNOL® 440 (HLB 8) from Evonik Industries), or secondary alcohol ethoxylates (commercially available as TERGITOL® 15-S-7 (HLB 12.1), TERGITOL® 15-S-9 (HLB 12.6), etc. from The Dow Chemical Co.). In an example, the surfactant is oleth-3-phosphate, ethoxylated 2,4,7,9-tetramethyl 5 decyn-4,7-diol, or combinations thereof. In some examples, it has been found that the combination of SURFYNOL® 465 and SURFYNOL® 440, together or also in combination with the oleth-3-phosphate, may contribute to the synergistic effects of the inks disclosed herein in terms of wetting.

When oleth-3-phosphate is included, it may be present in an amount ranging from about 0.1 wt % to about 0.75 wt % based on the total weight of the ink. In an example, the oleth-3-phosphate is present in an amount ranging from about 0.2 wt % to about 0.5 wt % based on the total weight of the ink. Oleth-3-phosphate is commercially available as CRODAFOS™ O3A or CRODAFOS™ N-3 acid from Croda. It is believed that the oleth-3-phosphate may aid the chelating agent (when included) in effectively trapping high levels of metal ions present in the ink (e.g., from the colorant dispersion), and that the chelating agent (when included) keeps the oleth-3-phosphate from precipitating out of the ink. This combination may contribute to the significant and unexpected reduction in kogation in the thermal inkjet printhead. Kogation refers to the deposit of dried ink on a heating element of a thermal inkjet printhead, and the combination of the oleth-3-phosphate with the chelating agent assists in preventing the buildup of kogation and extending the life of the printhead.

The chelating agent is another example of an additive that may be included in the ink. When included, the chelating agent is present in an amount greater than 0 wt % actives and less than 0.1 wt % actives based on the total weight of the ink. In an example, the chelating agent is present in an amount ranging from about 0.04 wt % actives to about 0.08 wt % actives based on the total weight of the ink. The wt % actives of the chelating agent accounts for the loading (as a weight percent) of the active chelator/chelating agent present in the ink, and does not account for the weight of other components of the chelating agent solution (e.g., water) in the inkjet ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The surfactant and chelating agent, and their respective amounts, may depend, in part, on the colorant dispersion that is included in the ink. In an example, the ink is a black ink or a magenta ink, the chelating agent is present in an amount greater than 0 wt % actives and less than 0.1 wt % actives based on the total weight of the ink, and the surfactant is a combination of oleth-3-phosphate and ethoxylated 2,4,7,9-tetramethyl 5 decyn-4,7-diol. In another example, the ink is a cyan ink or a yellow ink, the chelating agent is present in an amount greater than 0 wt % actives and less than 0.1 wt % actives based on the total weight of the ink, and the surfactant is ethoxylated 2,4,7,9-tetramethyl 5 decyn-4,7-diol.

In an example, the pH of the thermal inkjet dye sublimation ink ranges from about 7 to about 9.5 at the time of manufacture. In another example, the pH of the thermal inkjet dye sublimation ink ranges from about 8 to about 9 at the time of manufacture. pH adjuster(s), such as a buffer, may be added to the ink to counteract any slight pH drop that may occur over time. The pH may drop from about 0.5 units to about 1 unit over time after being manufactured. As such, the pH of the inks disclosed herein may be lower than the ranges set forth herein, depending, in part, upon how much time has passed since manufacture. In an example, the total amount of buffer(s) in the ink ranges from 0 wt % to about 0.5 wt % (with respect to the weight of the thermal inkjet dye sublimation ink). In another example, the total amount of buffer(s) in the ink is about 0.1 wt % (with respect to the weight of the thermal inkjet dye sublimation ink). Examples of some suitable buffers include TRIS (tris(hydroxymethyl) aminomethane or Trizma), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

In an example, the total amount of biocide(s) in the thermal inkjet dye sublimation ink ranges from about 0 wt % actives to about 0.5 wt % actives (with respect to the weight of the thermal inkjet dye sublimation ink). In another example, the total amount of biocide(s) in the inkjet ink composition is about 0.001 wt % actives to about 0.1 wt % actives (with respect to the weight of the thermal inkjet dye sublimation ink). The wt % actives of the biocide accounts for the loading (as a weight percent) of the active biocidal agent present in the ink, and does not account for the weight of other components of the biocide (e.g., water) in the inkjet ink.

Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

It is to be understood that water is not considered a solvent or co-solvent in the inks disclosed herein, but rather is present in addition to the co-solvent system and makes up a balance of the ink. As such, the weight percentage of the water present in the thermal inkjet dye sublimation inks will depend, in part, upon the weight percentages of the other components. The water may be purified or deionized water.

Referring now to FIG. 1, examples of the dye sublimation ink disclosed herein may be dispensed from a thermal inkjet printhead during examples of the printing method 100. One example of the method 100 (for direct printing) is shown at reference numerals 102 and 106. Another example of the method 100 (for transfer printing) is shown at reference numerals 102, 106, 108, and 110. Either example of the method 100 may also include reference numeral 104.

The example of the method 100 shown at reference numerals 102 and 106 includes selecting a dye sublimation ink, including: a disperse dye colorant dispersion present in an amount ranging from about 1 wt % actives to about 7 wt % actives based on a total weight of the ink; a co-solvent system present in a total amount ranging from about 12 wt % to about 25 wt % based on the total weight of the ink, the co-solvent system consisting of: glycerol present in an amount ranging from about 9 wt % to about 16 wt % based on the total weight of the ink; ethoxylated glycerol present in an amount ranging from 0 wt % to about 5 wt % based on the total weight of the ink; and a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and a balance of water (as shown at reference numeral 102); and thermal inkjet printing, from a thermal inkjet printhead, the dye sublimation ink directly onto a textile fabric to form an image (as shown at reference numeral 106).

The example of the method 100 shown at reference numerals 102, 106, 108 and 110 includes selecting a dye sublimation ink, including: a disperse dye colorant dispersion present in an amount ranging from about 1 wt % actives to about 7 wt % actives based on a total weight of the ink; a co-solvent system present in a total amount ranging from about 12 wt % to about 25 wt % based on the total weight of the ink, the co-solvent system consisting of: glycerol present in an amount ranging from about 9 wt % to about 16 wt % based on the total weight of the ink; ethoxylated glycerol present in an amount ranging from 0 wt % to about 5 wt % based on the total weight of the ink; and a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and a balance of water (as shown at reference numeral 102); and thermal inkjet printing, from a thermal inkjet printhead, the dye sublimation ink onto a transfer medium to form an image on the transfer medium (as shown at reference numeral 108); and transferring the image from the transfer medium onto a textile substrate (as shown at reference numeral 110).

A thermal inkjet printhead uses a certain minimum energy to fire ink drops of the proper volume (herein called the turn-on energy). To accommodate various manufacturing tolerances, it may be desirable to deliver more energy to the average printhead than is required to fire it (called "over-energy") in order to allow for any uncertainty. However, it has been found that the inks disclosed herein can be printed at an operating energy that includes a margin over the turn-on energy (TOE) for the printhead, wherein the margin ranges from about 10% to about 25% over the TOE. In an example, the margin is about 15% over the TOE. The low over-energy printing may also contribute to the improved performance of the cyan inks disclosed herein. As such, either example of the method 100 may include applying to a heating resistor of the thermal inkjet printhead an operating energy that includes a margin over a turn-on energy (TOE) for the printhead, wherein the margin ranges from about 10% to about 25% over the TOE (as shown at reference numeral 104).

The textile substrate may be polyester fabric, a polyester coated surface, blends of polyester and other materials (e.g., cotton, linen, etc.) as long as polyester is present in an amount of at least 50 wt % and is present at or near the surface of the fabric, nylons, or other fabrics. In one example, the polyester blend includes from about 70 wt % to about 80 wt % of the polyester. Examples of materials that may be coated with polyester include glass, metal, wood, plastics, ceramics, etc.

With direct printing onto the textile, the dye sublimation ink is thermally inkjetted onto the surface of the textile substrate (reference numeral 106). Once the dye sublimation ink disclosed herein is thermal inkjet printed directly on the textile, the textile may be exposed to heat, or heat and pressure. The heat, or heat and pressure is sufficient to sublimate the disperse dye so that it converts to a gas and penetrates into the textile. The heat, or heat and pressure may also be sufficient to open up the fibers of the textile substrate and allow the dye to migrate into the fibers. The dye then re-solidifies on the fibers of the textile substrate, which renders the printed image durable, wash-resistant, and colorfast. The heat to initiate sublimation may range from about 182° C. to about 215° C., and the pressure may range from 0 psi to about 100 psi.

With transfer printing onto the textile substrate, the dye sublimation ink is thermally inkjetted onto the surface of a transfer medium (reference numeral 108). The desired final image may be printed as a mirror image or in reverse on the transfer medium. The transfer medium may be any substrate that will accept the ink and also facilitate the release of the ink. The transfer medium may be a coated paper (from 30 gsm to 150 gsm).

The image on the transfer medium is then transferred to the desired textile substrate (reference numeral 110). To make the transfer, the printed on transfer medium is placed into contact with the textile substrate, and the two are exposed to heat, or heat and pressure to effect the sublimation. The transfer process may involve a heat press or a calender. In the heat press or calender, the printed transfer medium is brought into contact with the textile substrate that is to be imaged. The heat to initiate sublimation may range from about 182° C. to about 215° C., and the pressure may range from 0 psi to about 100 psi. The sublimated dye is converted to a gas and is able to penetrate into the textile substrate it is in contact with. The dye then re-solidifies on the fibers of the textile substrate, which renders the printed image durable, wash-resistant, and colorfast. The heat to initiate sublimation may range from about 182° C. to about 215° C., and the pressure may range from 0 psi to about 100 psi.

The dye sublimation inks disclosed herein are jettable via thermal inkjet printheads and cartridges.

Figure 3:
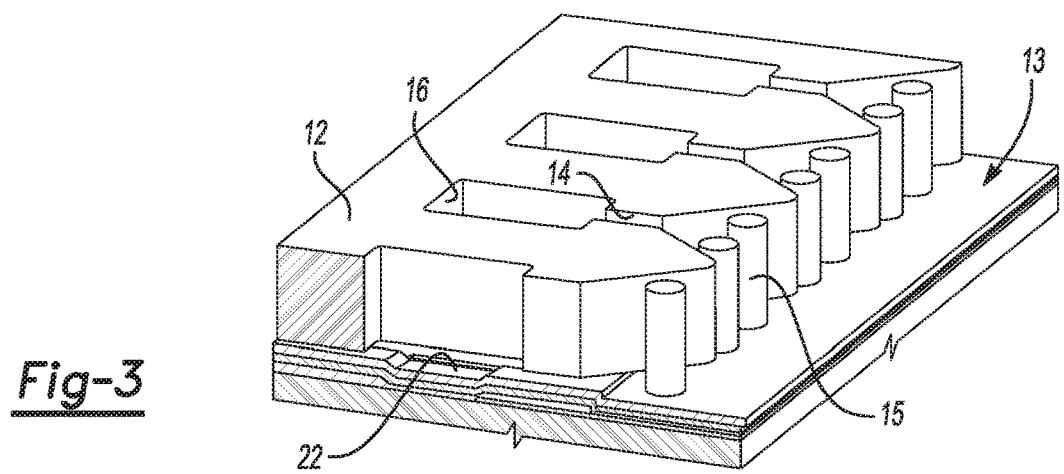
FIG. 3 is a partially cross-sectioned perspective semi-schematic illustration showing an example of ink chambers of an example thermal inkjet printhead.

Referring now to FIGS. 2-5 together, an example thermal inkjet printhead 10 generally includes a base substrate 11 (made, e.g., from silicon or another suitable material). The base substrate 11 may include multiple layers (as shown in FIG. 2) to operatively accommodate suitable electronics to fire printhead nozzles. The printhead 10 further includes a substrate 12 (made, e.g., from a polymeric or other suitable material) defined on the base substrate 11. The substrate 12 has at least one ink feed opening 14 and at least one ink chamber/reservoir 16 defined therein. Four ink feed openings 14 are shown in FIG. 3, though it is to be understood that any desirable number of ink feed openings 14 may be provided. The ink feed opening 14 is in operative and fluid communication with an ink chamber 16 and with an ink channel 13. In an example, one or more pillars 15 may be positioned between the ink channel 13 and the ink feed opening 14 to filter the ink supply before it enters the ink chamber 16.

The ink chamber 16 is generally configured to repeatedly receive ink, via ink feed opening 14 and ink channel 13, from an ink supply or source during inkjet printing. In one example, the printhead 10 may be incorporated with an ink cartridge 26 (see FIG. 5), and the ink chamber 16 receives the ink from one or more ink supply regions housing, e.g., a volume of free ink and/or a capillary media configured to store the ink in individual capillaries. In another example, the printhead 10 may be a separate unit operatively connected (via appropriate tubing or the like) to a remotely located ink supply. In other words, printheads 10 can be integrated into the ink cartridge 26 (Integrated Print Head: IPH); or a printhead 10 can be integrated into a printer which has Individual Ink Cartridges (IIC). It is to be understood that other configurations of the thermal inkjet printhead 10 are also contemplated herein.

Figure 4:
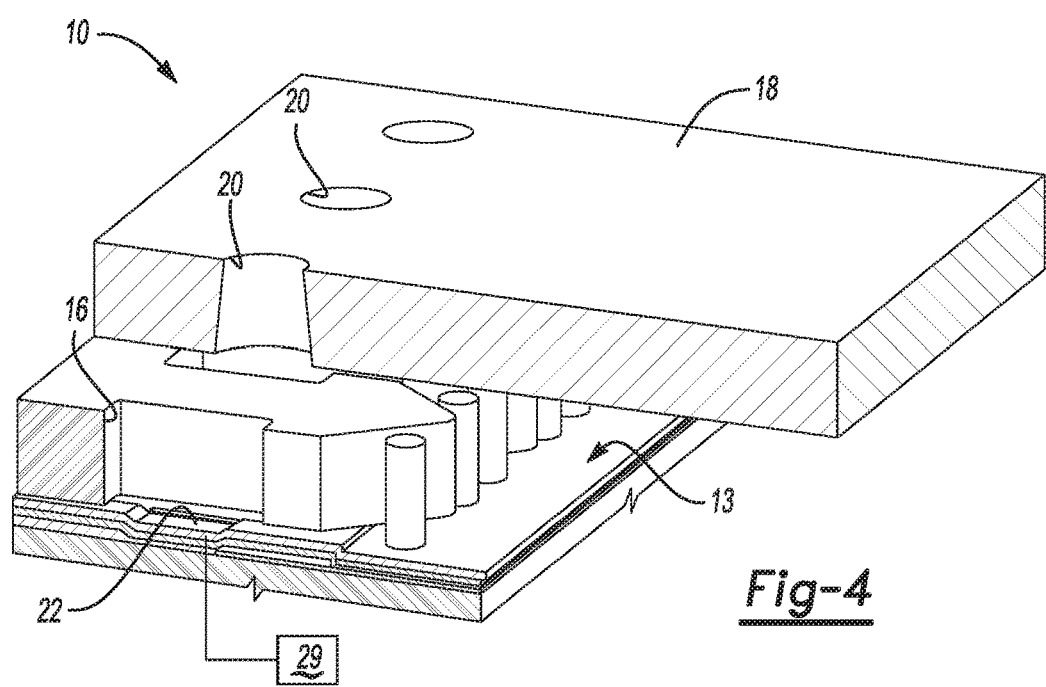
FIG. 4 is a partially cross-sectioned perspective semi-schematic illustration showing an example of a nozzle plate of an example thermal inkjet printhead.

The printhead 10 further includes a nozzle plate 18 disposed on the substrate 12. In an example, the nozzle plate 18 includes a plurality of orifices 20 (three of which are shown in FIG. 4). The orifice 20 is generally in fluid communication with the ink chamber 16 and is configured to eject an ink drop therethrough during an ink ejection process (i.e., the pushing of the ink out of the printhead 10 through the orifice 20 during thermal inkjet printing).

A heating/firing resistor 22 is operatively disposed on the base substrate 11 and proximate to the ink feed opening(s) 14 and ink chamber(s) 16. The heating/firing resistor 22 is also operatively associated with the orifice 20. Although FIG. 4 depicts that the heating/firing resistor 22 is operatively associated with a single orifice 20, it is to be understood that the resistor 22 may also be operatively associated with a plurality of orifices 20.

In an example of a thermal inkjet printhead 10, an array of ink chambers 16 receives liquid ink from the ink channel 13. The heating/firing resistor 22 is located opposite the nozzle/orifice 20 so that ink can collect between it and the orifice 20. The firing of ink droplets is typically under the control of a microprocessor (not shown), the signals of which are conveyed by electrical traces to the resistors 22. When electric printing pulses/electrical current is passed through the inkjet firing/heating resistor 22 to heat it to the desired firing temperature, a small portion of the ink next to it vaporizes and ejects a drop of ink from the printhead 10.

Figure 5:
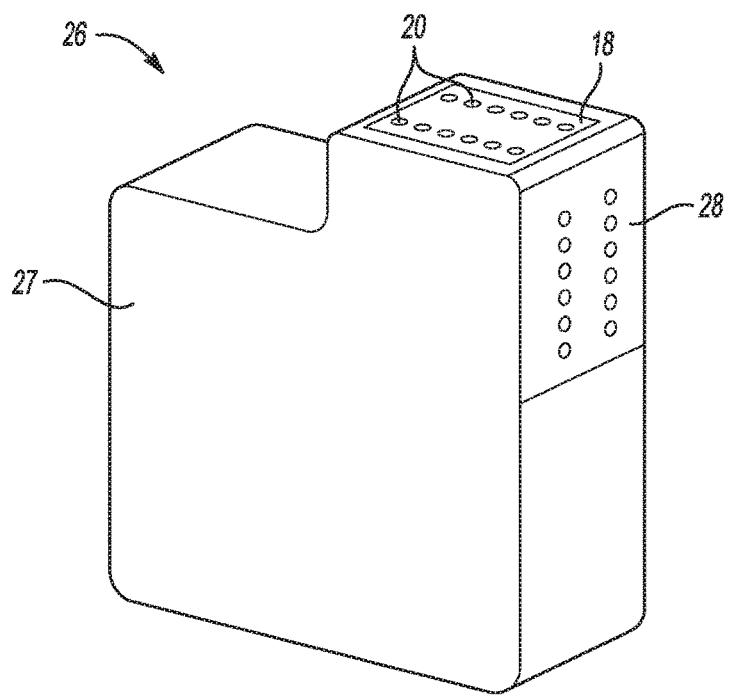
FIG. 5 is a perspective view of an example of a thermal inkjet cartridge.

FIG. 5 is a semi-schematic illustration of an inkjet print cartridge 26 incorporating a printhead 10 according to an example. The inkjet print cartridge 26 includes an internal ink reservoir (not shown) within the cartridge body 27 and a printhead. The body 27 can include the ink reservoir wholly contained within the cartridge body 27 or, alternatively, can include a chamber inside the cartridge body 27 that is fluidly coupled to one or more off-axis ink reservoirs (not shown).

The printhead includes a nozzle plate 18 including orifices 20 formed in a flexible polymer circuit. The flexible circuit provides for the routing of conductive traces which are connected at one end to electrodes on the substrate and on the other end to contact pads 28. The print cartridge 26 is designed to be installed in a printer so that the contact pads 28 on the front surface of the flexible circuit contact printer electrodes, thereby providing externally generated energization signals to the printhead. Each resistor 22 may act as an ohmic heater when selectively energized by one or more pulses applied sequentially or simultaneously to one or more of the contact pads 28.

A printhead controller 29 is operatively connected to the heating resistor 22, to activate an electrical current to pass the electrical current through the heating resistor 22 to apply an operating energy that, in some examples, includes a margin over a turn-on energy (TOE) for the printhead 10, wherein the margin ranges from about 10% to about 25% over the TOE.

It is to be understood that a single printhead 10 may include multiple (e.g., 400 or some other desirable number) heating/firing resistors 22 and orifices 20. While not shown, it is to be understood that the printhead 10 includes an integrated circuit that selectively routes signals (e.g., from the microprocessor (operatively associated with the printhead controller 29) that is capable of running suitable computer readable instructions) to the desirable resistor(s) 22 and orifice(s) 20 for firing ink drops therefrom to produce images directly on the textile substrate or on a transfer medium.

The print cartridge 26 including the heating/firing resistor 22 may be mounted in a carriage of an inkjet printer (not shown). The carriage may move the print cartridge 26 across a print substrate (e.g., the textile substrate or the transfer medium) in a print/image zone of the printer. The orifice(s) 20 associated with the resistor 22 may be arranged in one or more linear orifice arrays. The orifice(s) 20 may be aligned parallel to the direction in which the print substrate is moved through the printer and perpendicular to the direction of motion of the resistor 22 with the print cartridge 26. Control of the ejection of thermal inkjet dye sublimation ink from each orifice 20 causes characters, or other images, to be printed in a swath across the textile substrate or the transfer medium.

Alternatively, the print cartridge 26 may be a page-wide print cartridge that is in fluid communication with an off-axis ink supply system. The page-wide print cartridge includes a print head bar that extends the entire print/image zone, and thus the page-wide print cartridge is static during a printing operation.

Figure 6:
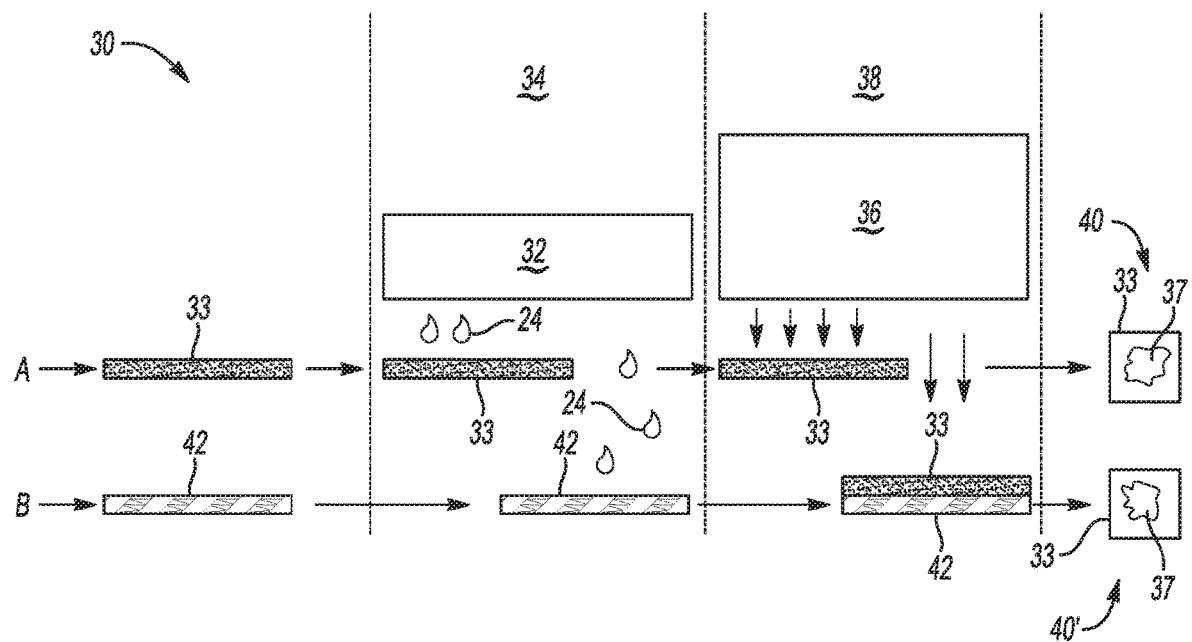
FIG. 6 is a schematic diagram of two examples of a printing system.

Referring now to FIG. 6, a schematic diagram of a printing system 30 including a thermal inkjet printer 32 in a printing zone 34 of the printing system 30 and a dryer 36 positioned in a sublimation zone 38 of the printing system 30.

In one example, a textile substrate 33 may be transported through the printing system 30 along the path shown by arrow A such that the textile substrate 33 is first fed to the printing zone 34 where an example of the thermal inkjet dye sublimation ink 24 disclosed herein is inkjet printed directly onto the textile substrate 33 by the thermal inkjet printer 32 (for example from the printhead 10 as described above) to form an ink layer on the textile substrate 33. The ink layer disposed on the textile substrate 33 may be heated in the printing zone 34 (for example, the air temperature in the printing zone 34 may range from about 10° C. to about 90° C.) such that water may be at least partially evaporated from the ink layer. As an example, at least partial evaporation means that at least 50% of the water is removed. As another example, at least 80% of the water may be removed during evaporation. Generally, it is desirable for enough water to be removed from an area so that color in the area is not transferred to an adjacent portion/facing surface of the textile substrate 33 during/after rolling that comes in contact with the area. The textile substrate 33 (having the ink layer printed thereon) may then be transported to the sublimation zone 38 where the ink layer is heated or heated and exposed to pressure to sublimate the dye, causing it to penetrate into the textile substrate 33. This forms the printed article 40 including the image 37 formed on the textile substrate 33.

In another example, a transfer medium 42 may be transported through the printing system 30 along the path shown by arrow B such that the transfer medium 42 is first fed to the printing zone 34 where an example of the thermal inkjet dye sublimation ink 24 disclosed herein is inkjet printed directly onto the transfer medium 42 by the thermal inkjet printer 32 (for example, from the printhead 10 as described above) to form an ink layer on the transfer medium 42. The transfer medium 42 (having the ink layer printed thereon) may then be transported to the sublimation zone 38 and placed into contact with the textile substrate 42. In the sublimation zone 38, the ink layer is heated, or heated and exposed to pressure, to sublimate the dye from the transfer medium 42, causing it to penetrate into the penetrable textile substrate 33. This forms the printed article 40' including the image 37 formed on the textile substrate 33. Dye sublimation transfer printing is also known as blocking and/or backside transfer printing.

To further illustrate the present disclosure, an example is given herein. It is to be understood that this example is provided for illustrative purposes and is not to be construed as limiting the scope of the present disclosure.

EXAMPLES

Example 1

Four comparative example inks (comp. black, comp. cyan, comp. magenta, and comp. yellow) were prepared with 20 wt % of glycerol or of a combination of glycerol and ethoxylated glycerol. The formulations for the comparative inks are shown in Table 1.

Four example inks (black 1, cyan 1, magenta 1, and yellow 1) were prepared with 16 wt % of glycerol or of a combination of glycerol and ethoxylated glycerol. The formulations for these example inks are shown in Table 2.

Four additional example inks (black 2, cyan 2, magenta 2, and yellow 2) were prepared with 12 wt % of glycerol or of a combination of glycerol and ethoxylated glycerol. The formulations for these example inks are shown in Table 3.

In each of the tables, the weight percentages given for the dye dispersion, the chelating agent, and the biocides represent wt % actives in the ink formulations.

TABLE 1

| Ingredient | Specific Component | Comp. Black (wt %) | Comp. Cyan (wt %) | Comp. Magenta (wt %) | Comp. Yellow (wt %) |
|---|---|---|---|---|---|
| Dye Dispersion | Black Dispersion | 4.25 | N/A | N/A | N/A |
| | Cyan Dispersion | N/A | 4.25 | N/A | N/A |
| | Magenta Dispersion | N/A | N/A | 5 | N/A |
| | Yellow Dispersion | N/A | N/A | N/A | 3.5 |
| Solvent | Glycerol | 15 | 20 | 15 | 15 |
| | Ethoxylated Glycerol | 5 | N/A | 5 | 5 |
| Surfactant | SURYNOL ® 465 | 0.5 | 0.5 | 0.5 | 0.5 |
| Jetting Aid (surfactant) | Oleth-3-Phosphate | 0.2 | N/A | 0.2 | N/A |
| Chelating Agent | TRILON ® M | 0.04 | 0.04 | 0.04 | 0.04 |
| Buffer | TRIS | 0.1 | 0.1 | 0.1 | 0.1 |
| Biocide | ACTICIDE B20 | 0.0045 | 0.0045 | 0.04 | 0.0045 |
| | ACTICIDE M20 | 0.0095 | 0.0095 | 0.02 | 0.0095 |
| Water | | Balance | Balance | Balance | Balance |

TABLE 2

| Ingredient | Specific Component | Black 1 (wt %) | Cyan 1 (wt %) | Magenta 1 (wt %) | Yellow 1 (wt %) |
|---|---|---|---|---|---|
| Dye Dispersion | Black Dispersion | 4 | N/A | N/A | N/A |
| | Cyan Dispersion | N/A | 4.4 | N/A | N/A |
| | Magenta Dispersion | N/A | N/A | 5 | N/A |
| | Yellow Dispersion | N/A | N/A | N/A | 3.7 |
| Solvent | Glycerol | 12 | 16 | 12 | 12 |
| | Ethoxylated Glycerol | 4 | N/A | 4 | 4 |
| Surfactant | SURYNOL ® 465 | 0.5 | 0.5 | 0.5 | 0.5 |
| Jetting Aid (surfactant) | Oleth-3-Phosphate | 0.2 | N/A | 0.2 | N/A |
| Chelating Agent | TRILON ® M | 0.04 | 0.04 | 0.04 | 0.04 |
| Buffer | TRIS | 0.1 | 0.1 | 0.1 | 0.1 |
| Biocide | ACTICIDE B20 | 0.0045 | 0.0045 | 0.0045 | 0.0045 |
| | ACTICIDE M20 | 0.0095 | 0.0095 | 0.0095 | 0.0095 |
| Water | | Balance | Balance | Balance | Balance |

TABLE 3

| Ingredient | Specific Component | Black 2 (wt %) | Cyan 2 (wt %) | Magenta 2 (wt %) | Yellow 2 (wt %) |
|---|---|---|---|---|---|
| Dye Dispersion | Black Dispersion | 4 | N/A | N/A | N/A |
| | Cyan Dispersion | N/A | 4.4 | N/A | N/A |
| | Magenta Dispersion | N/A | N/A | 5 | N/A |
| | Yellow Dispersion | N/A | N/A | N/A | 3.7 |
| Solvent | Glycerol | 9 | 12 | 9 | 9 |
| | Ethoxylated Glycerol | 3 | N/A | 3 | 3 |
| Surfactant | SURYNOL® 465 | 0.5 | 0.5 | 0.5 | 0.5 |
| Jetting Aid (surfactant) | Oleth-3-Phosphate | 0.2 | N/A | 0.2 | N/A |
| Chelating Agent | TRILON® M | 0.04 | 0.04 | 0.04 | 0.04 |
| Buffer | TRIS | 0.1 | 0.1 | 0.1 | 0.1 |
| Biocide | ACTICIDE B20 | 0.0045 | 0.0045 | 0.0045 | 0.0045 |
| | ACTICIDE M20 | 0.0095 | 0.0095 | 0.0095 | 0.0095 |
| Water | | Balance | Balance | Balance | Balance |

The comparative and example inks were tested using HP 831 thermal inkjet color printheads and various test fixtures to repeatedly fire the printheads (at 15% over-energy) and to measure drop velocity (DV, in m/s) and drop weight (DW, in ng) at various life stages of the printheads, represented by millions of drops per nozzle (MDPN). Each of these values was taken at a given life stage, between 0 and 250 or 300 MDPN for the comparative examples and between 0 and 300 for the example inks. Two tests were performed for each of the comparative and example inks, where the respective inks were printed from both sides of respective printheads.

Figure 7A:
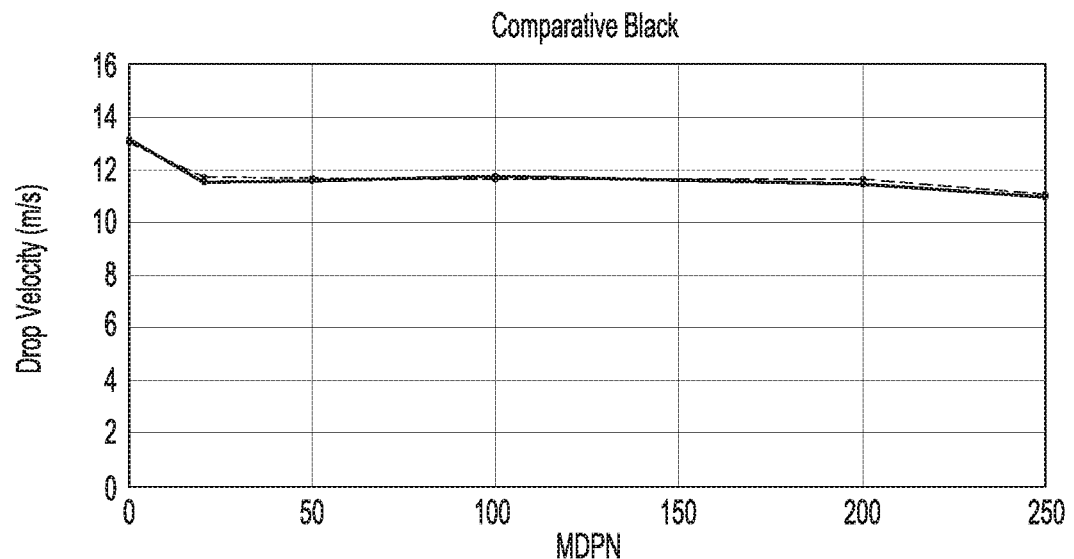
FIGS. 7A and 7B are graphs depicting the average drop velocity in meters per second (FIG. 7A) and the average drop weight in nanograms (FIG. 7B) at various printhead life stages in terms of millions of drops per nozzle (MDPN) for a comparative black ink.
Figure 7B:
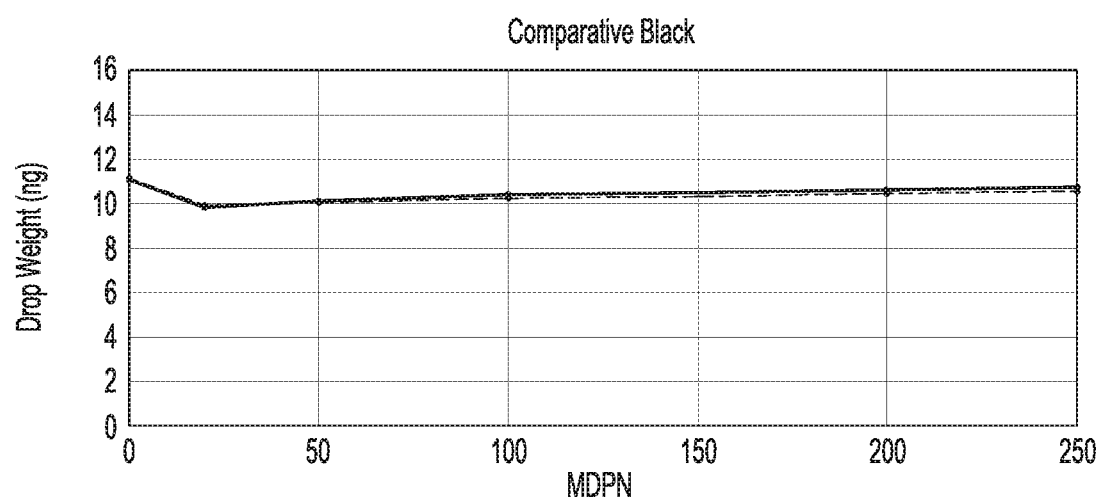
Figure 8A:
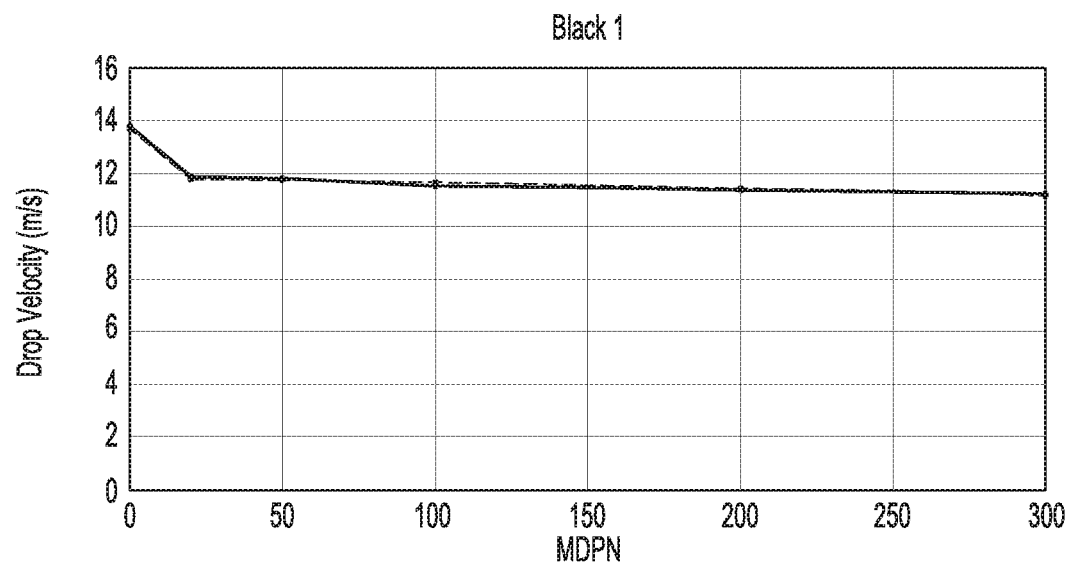
FIGS. 8A and 8B are graphs depicting the average drop velocity in meters per second (FIG. 8A) and the average drop weight in nanograms (FIG. 8B) at various printhead life stages in terms of millions of drops per nozzle (MDPN) for an example black thermal inkjet dye sublimation ink.
Figure 8B:
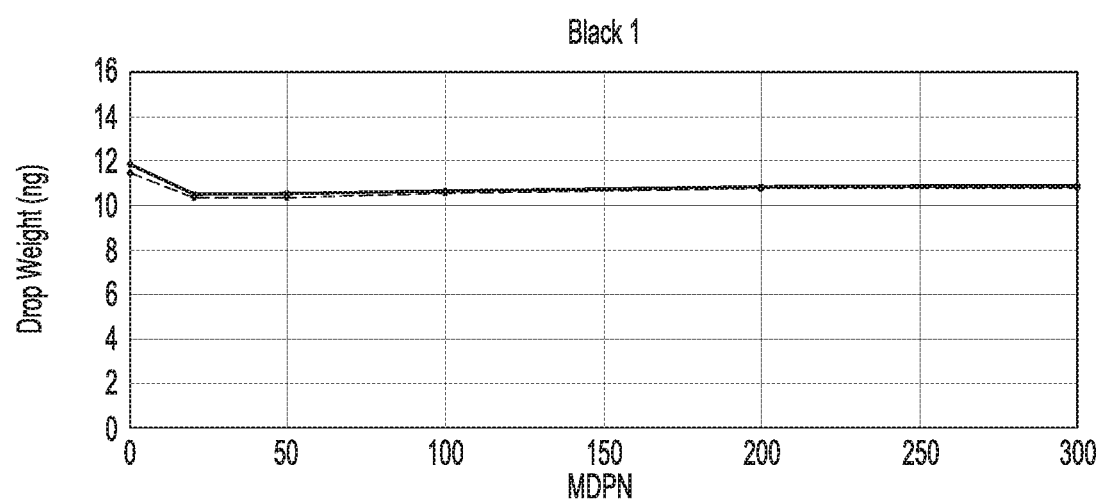
Figure 9A:
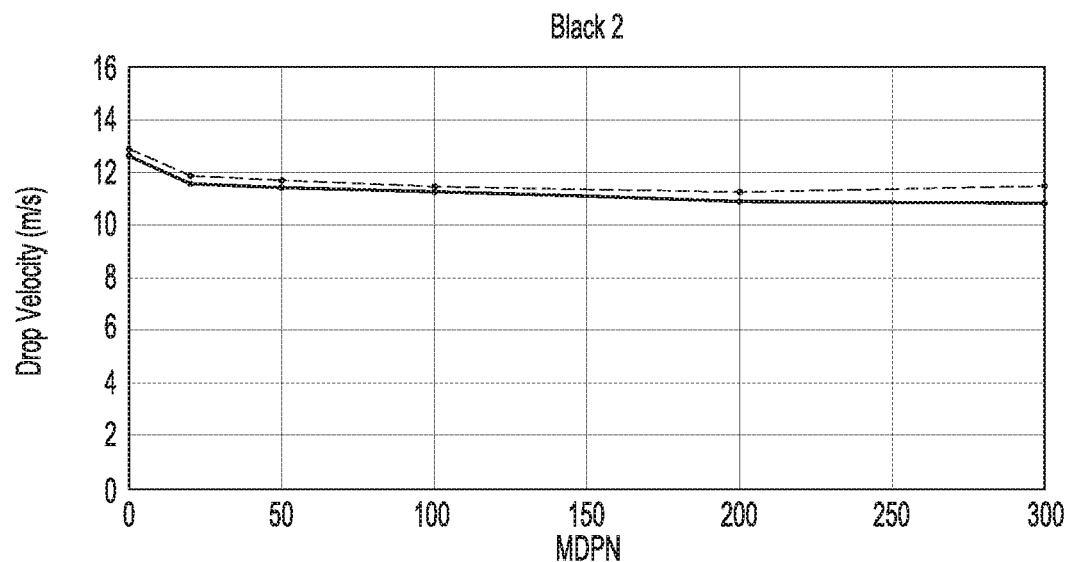
FIGS. 9A and 9B are graphs depicting the average drop velocity in meters per second (FIG. 9A) and the average drop weight in nanograms (FIG. 9B) at various printhead life stages in terms of millions of drops per nozzle (MDPN) for another example black thermal inkjet dye sublimation ink.
Figure 9B:
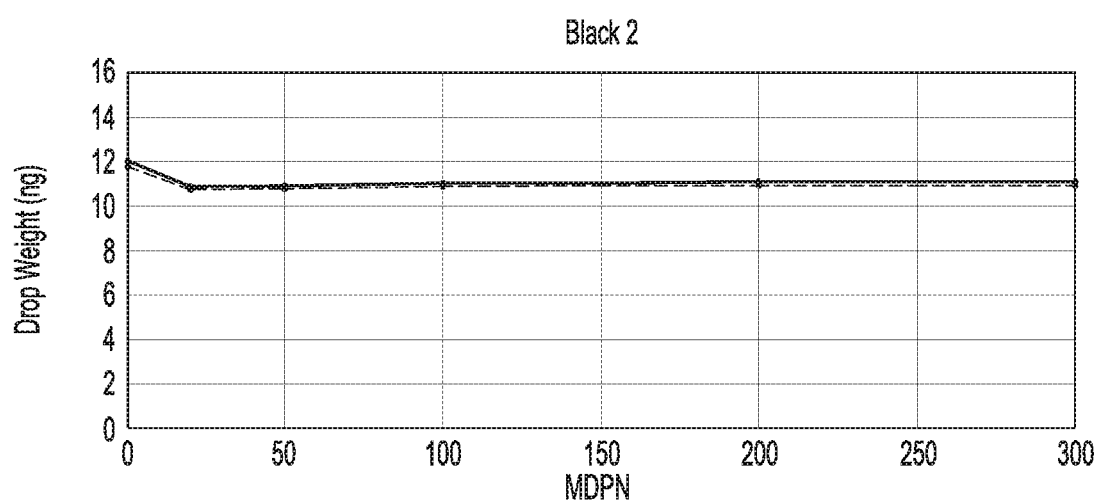

The average drop velocity and average drop weight results for the comparative black ink is shown in FIGS. 7A and 7B, respectively. The average drop velocity and average drop weight results for black 1 are shown in FIGS. 8A and 8B and for black 2 are shown in FIGS. 9A and 9B. Comparing the results for comparative black ink (FIGS. 7A and 7B) with black inks 1 and 2 (FIGS. 8A and 8B and FIGS. 9A and 9B), both drop velocity and drop weight were improved for black inks 1 and 2, which included the lower amounts of glycerol or glycerol and ethoxylated glycerol, especially at 250 MDPN.

Figure 10A:
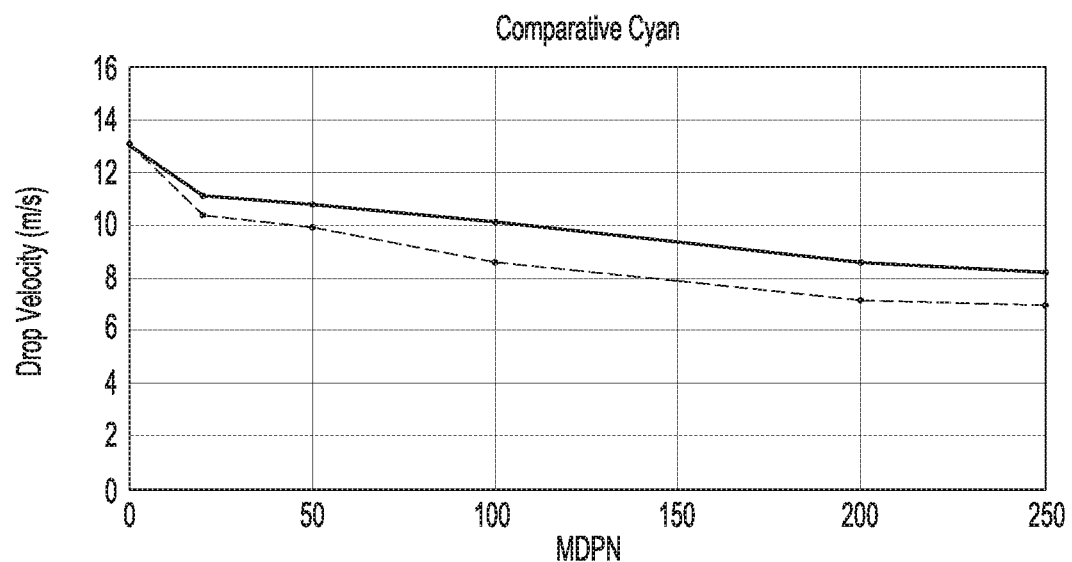
FIGS. 10A and 10B are graphs depicting the average drop velocity in meters per second (FIG. 10A) and the average drop weight in nanograms (FIG. 10B) at various printhead life stages in terms of millions of drops per nozzle (MDPN) for a comparative cyan ink.
Figure 10B:
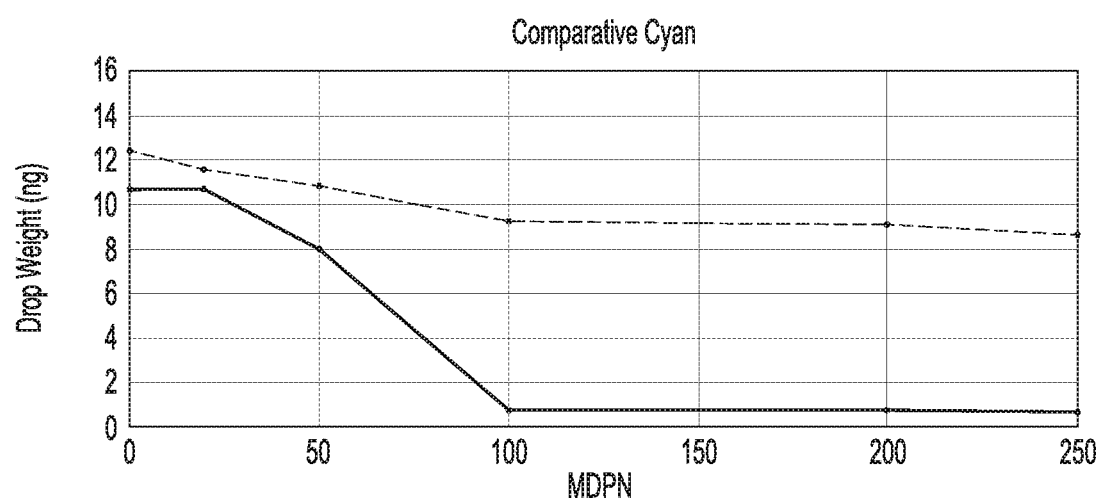
Figure 11A:
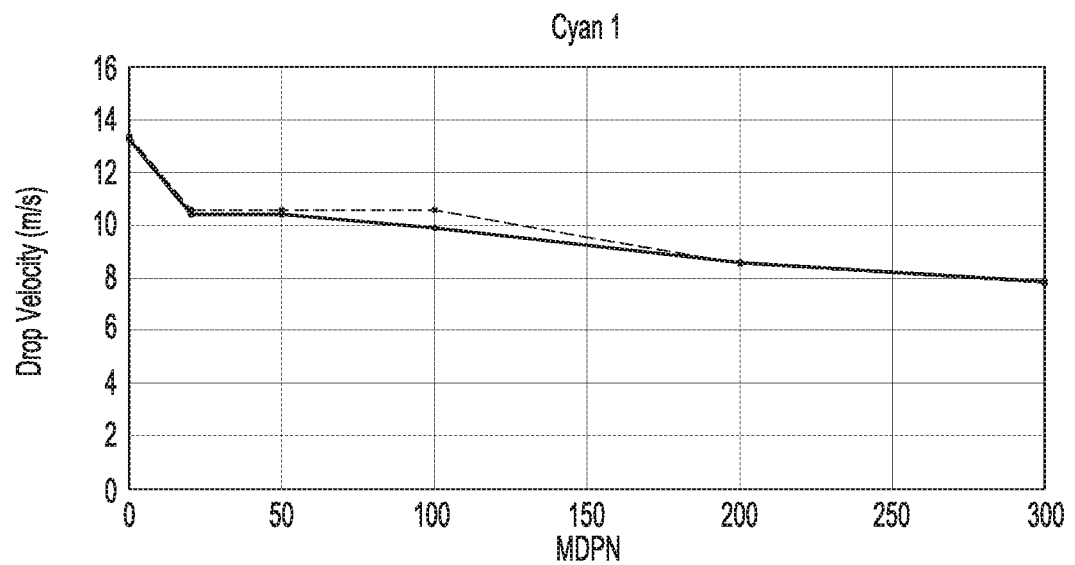
FIGS. 11A and 11B are graphs depicting the average drop velocity in meters per second (FIG. 11A) and the average drop weight in nanograms (FIG. 11B) at various printhead life stages in terms of millions of drops per nozzle (MDPN) for an example cyan thermal inkjet dye sublimation ink.
Figure 11B:
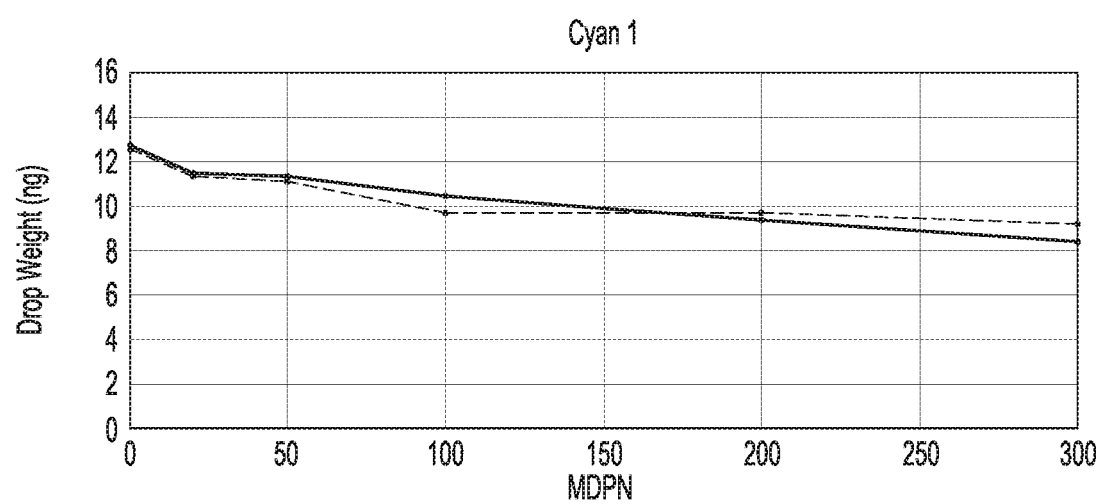
Figure 12A:
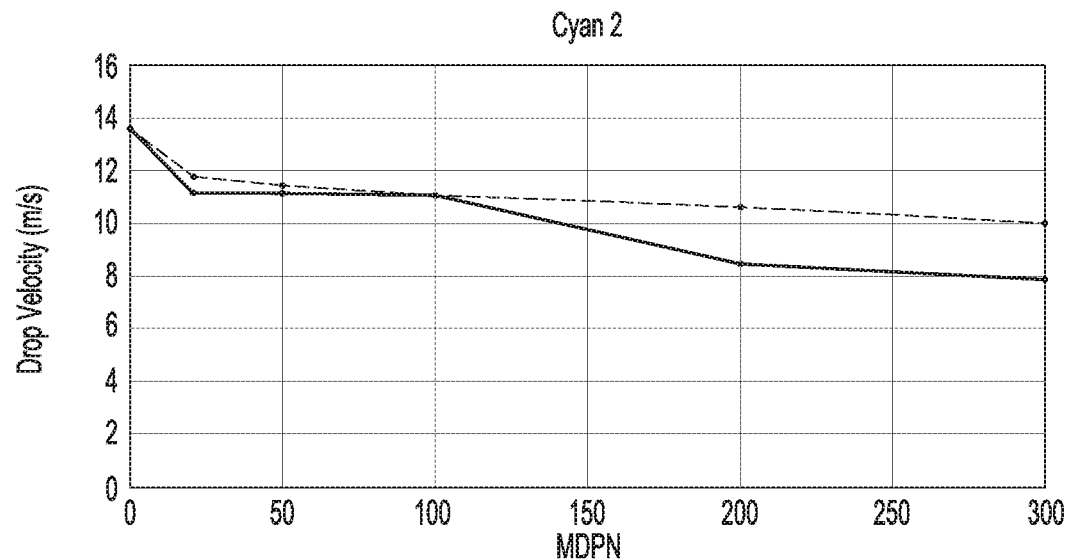
FIGS. 12A and 12B are graphs depicting the average drop velocity in meters per second (FIG. 12A) and the average drop weight in nanograms (FIG. 12B) at various printhead life stages in terms of millions of drops per nozzle (MDPN) for another example cyan thermal inkjet dye sublimation ink.
Figure 12B:
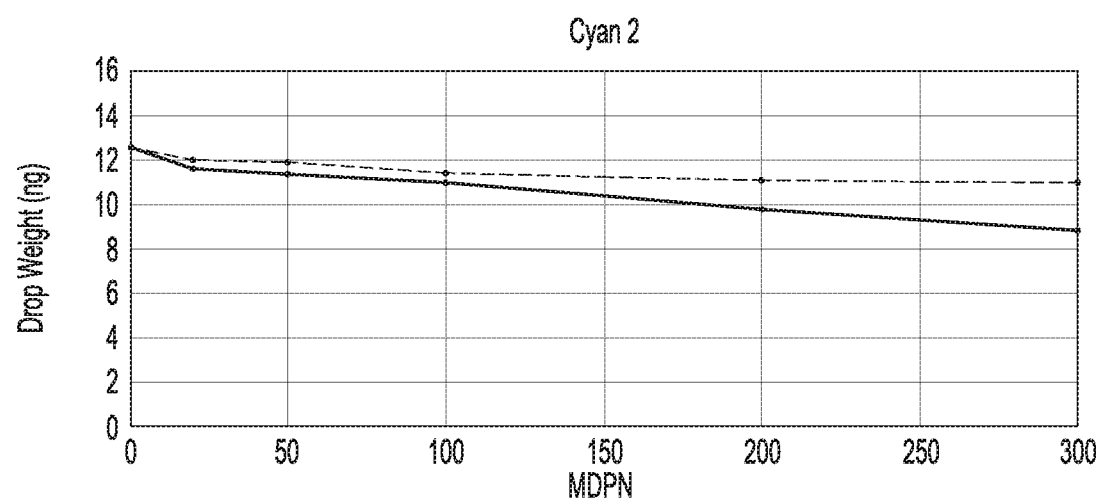

The average drop velocity and average drop weight results for the comparative cyan ink is shown in FIGS. 10A and 10B, respectively. The average drop velocity and average drop weight results for cyan 1 are shown in FIGS. 11A and 11B and for cyan 2 are shown in FIGS. 12A and 12B. Comparing the results for comparative cyan ink (FIGS. 10A and 10B) with cyan inks 1 and 2 (FIGS. 11A and 11B and FIGS. 12A and 12B), both drop velocity and drop weight were significantly improved for cyan inks 1 and 2, which included the lower amounts of glycerol or glycerol and ethoxylated glycerol. In particular, the drop weight for cyan ink 1 and 2 was much more consistent than comparative cyan ink throughout the printhead life.

Figure 13A:
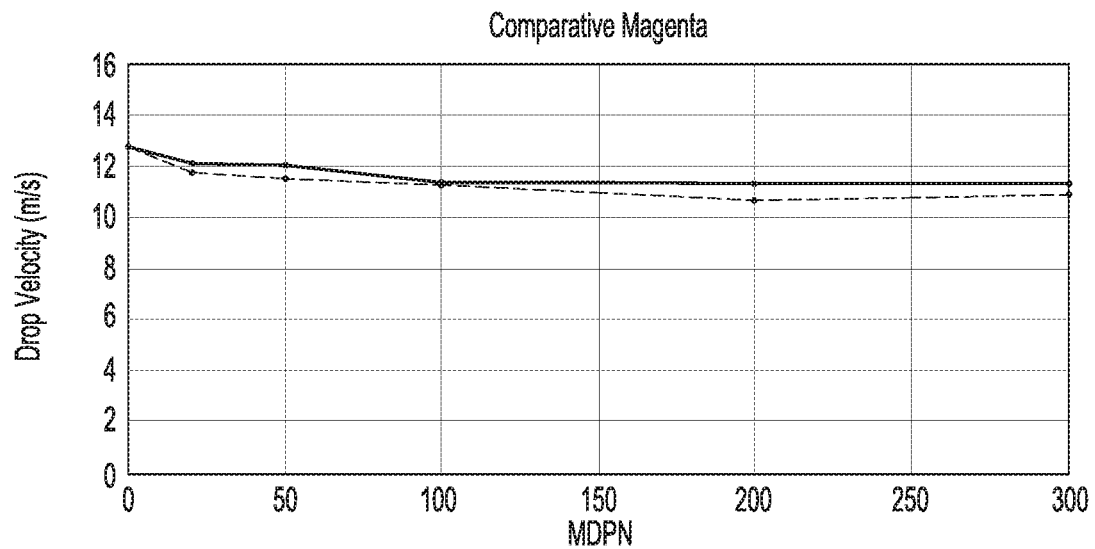
FIGS. 13A and 13B are graphs depicting the average drop velocity in meters per second (FIG. 13A) and the average drop weight in nanograms (FIG. 13B) at various printhead life stages in terms of millions of drops per nozzle (MDPN) for a comparative magenta ink.
Figure 13B:
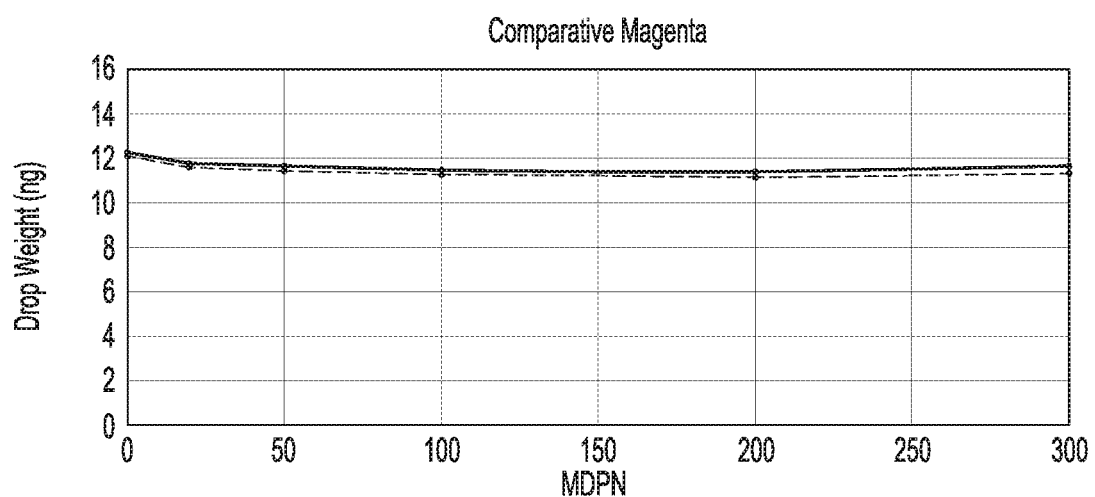
Figure 14A:
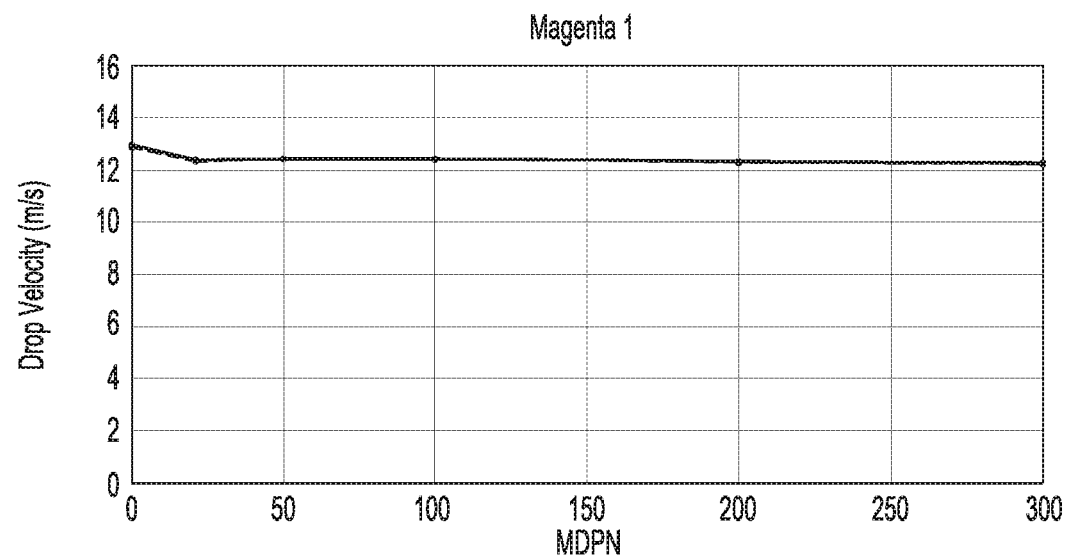
FIGS. 14A and 14B are graphs depicting the average drop velocity in meters per second (FIG. 14A) and the average drop weight in nanograms (FIG. 14B) at various printhead life stages in terms of millions of drops per nozzle (MDPN) for an example magenta thermal inkjet dye sublimation ink.
Figure 14B:
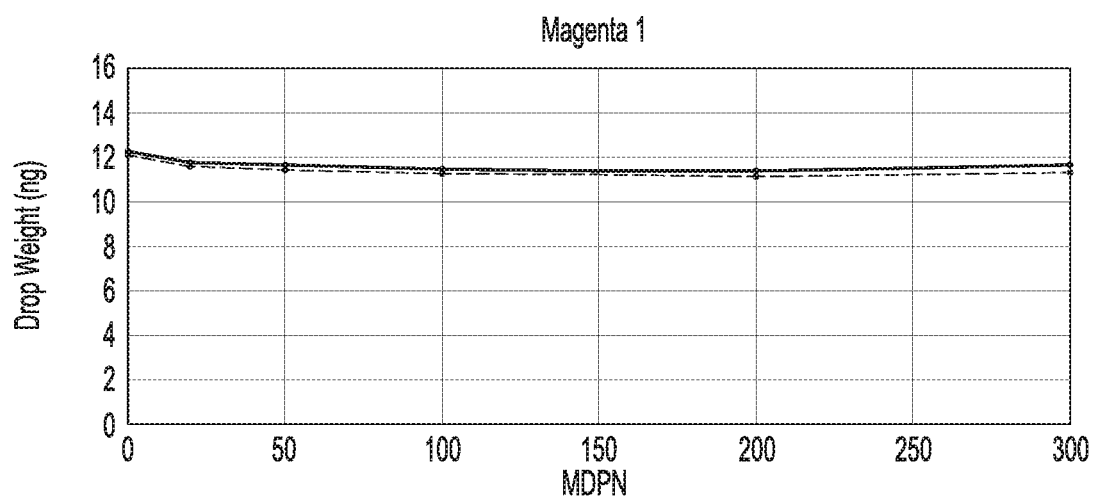
Figure 15A:
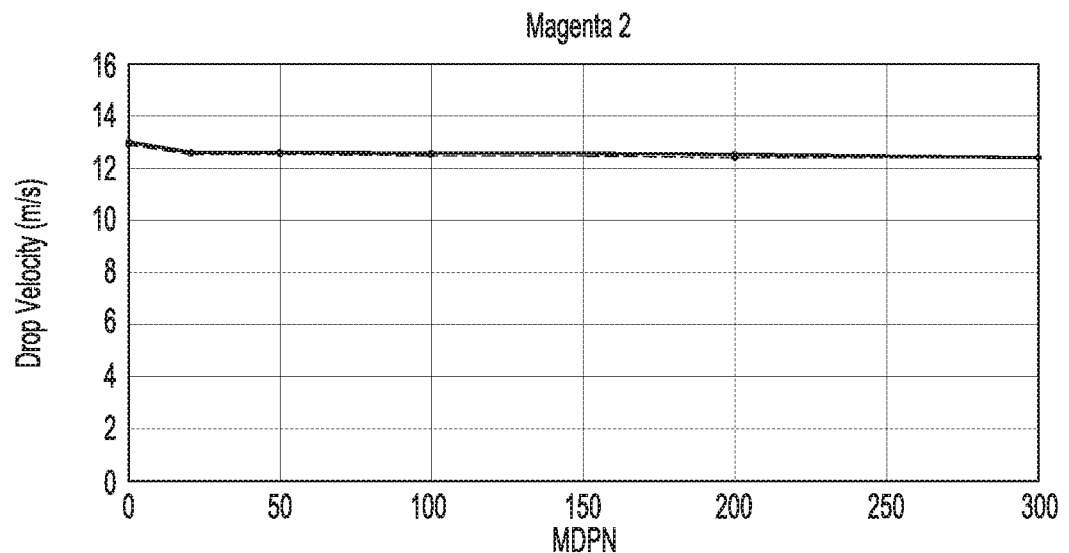
FIGS. 15A and 15B are graphs depicting the average drop velocity in meters per second (FIG. 15A) and the average drop weight in nanograms (FIG. 15B) at various printhead life stages in terms of millions of drops per nozzle (MDPN) for another example magenta thermal inkjet dye sublimation ink.
Figure 15B:
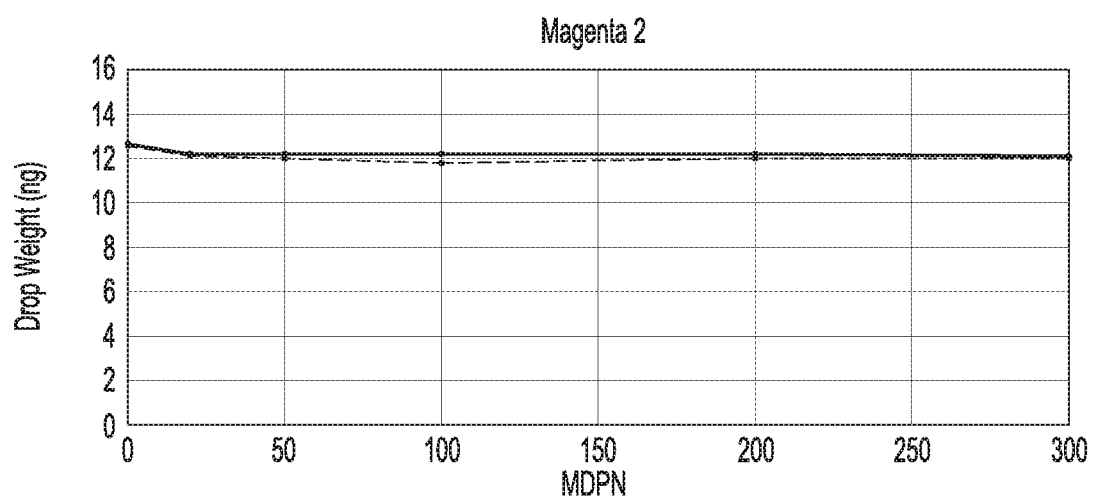

The average drop velocity and average drop weight results for the comparative magenta ink is shown in FIGS. 13A and 13B, respectively. The average drop velocity and average drop weight results for magenta 1 are shown in FIGS. 14A and 14B and for magenta 2 are shown in FIGS. 15A and 15B. Comparing the results for comparative magenta ink (FIGS. 13A and 13B) with magenta inks 1 and 2 (FIGS. 14A and 14B and FIGS. 15A and 15B), both drop velocity and drop weight were significantly improved for magenta inks 1 and 2, which included the lower amounts of glycerol or glycerol and ethoxylated glycerol. In particular, magenta inks 1 and 2 exhibited more consistent drop velocity and drop weight than comparative magenta ink from 50 MDPN through 250 MDPN.

Figure 16A:
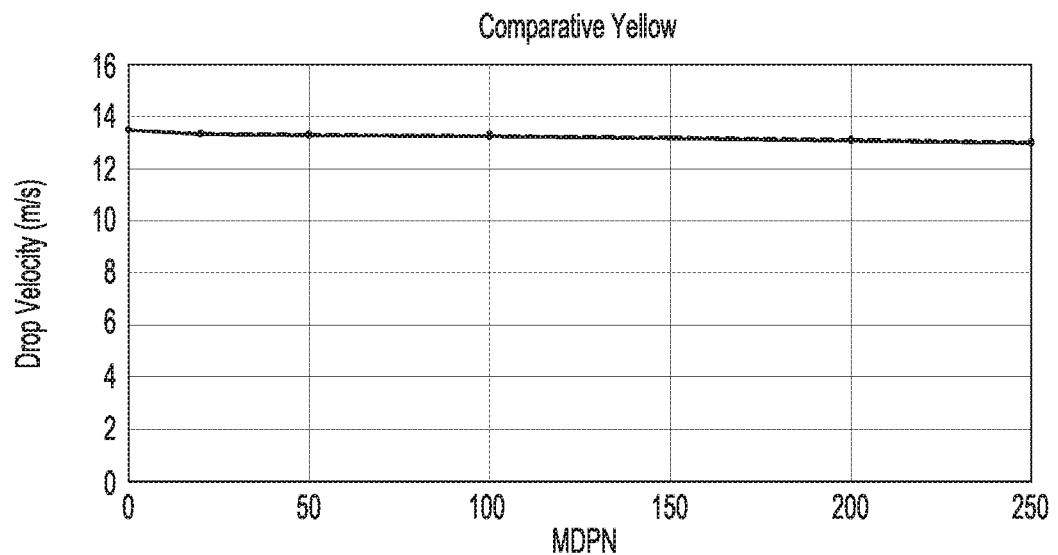
FIGS. 16A and 16B are graphs depicting the average drop velocity in meters per second (FIG. 16A) and the average drop weight in nanograms (FIG. 16B) at various printhead life stages in terms of millions of drops per nozzle (MDPN) for a comparative yellow ink.
Figure 16B:
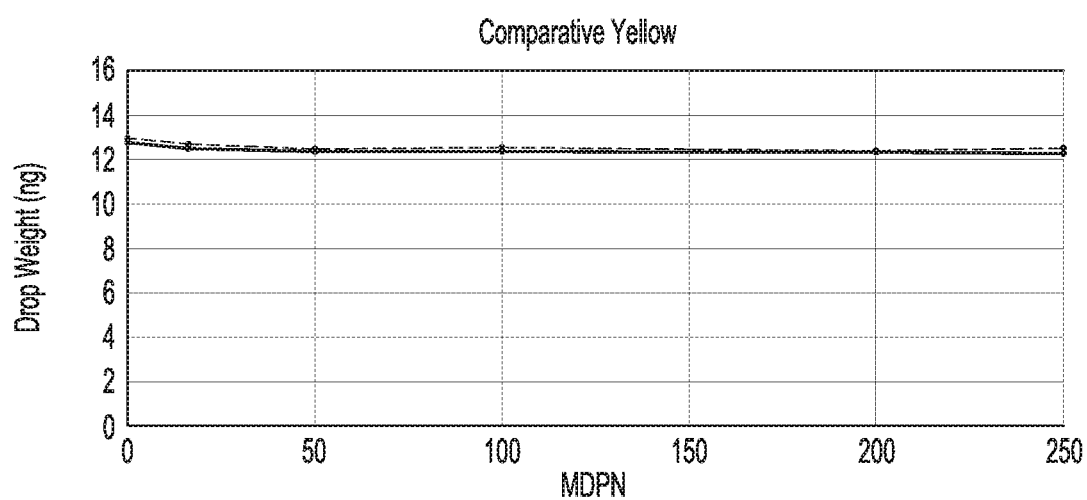
Figure 17A:
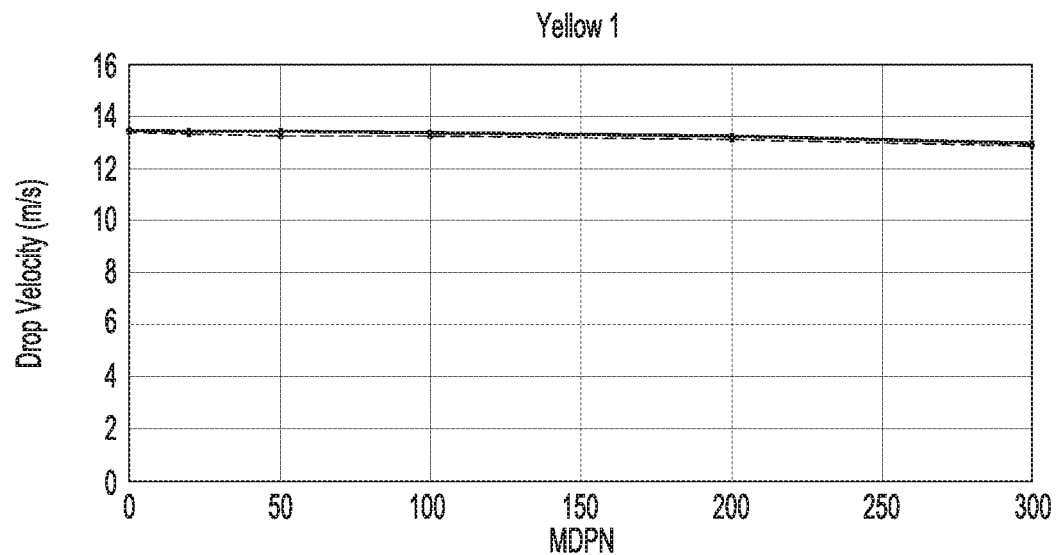
FIGS. 17A and 17B are graphs depicting the average drop velocity in meters per second (FIG. 17A) and the average drop weight in nanograms (FIG. 17B) at various printhead life stages in terms of millions of drops per nozzle (MDPN) for an example yellow thermal inkjet dye sublimation ink.
Figure 17B:
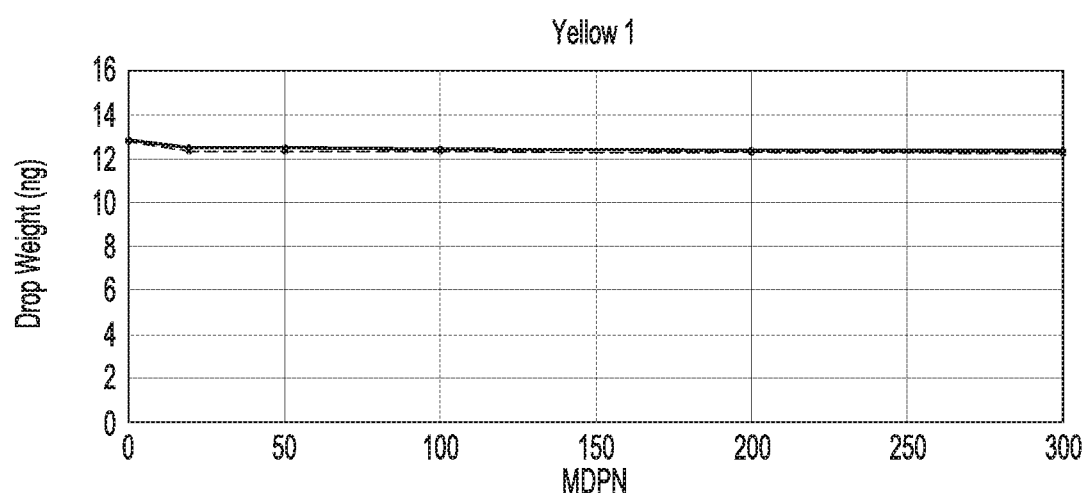
Figure 18A:
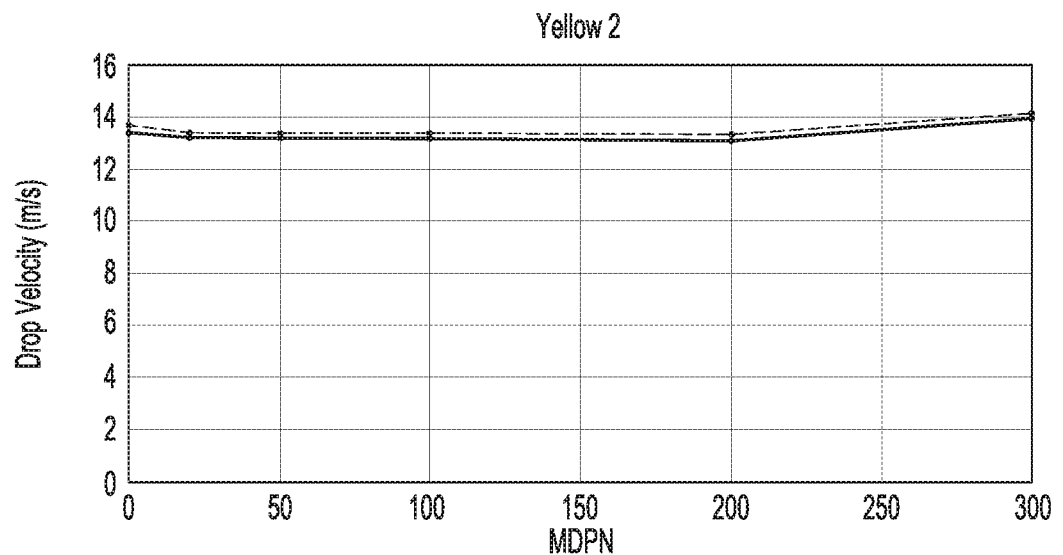
FIGS. 18A and 18B are graphs depicting the average drop velocity in meters per second (FIG. 18A) and the average drop weight in nanograms (FIG. 18B) at various printhead life stages in terms of millions of drops per nozzle (MDPN) for another example yellow thermal inkjet dye sublimation ink.
Figure 18B:
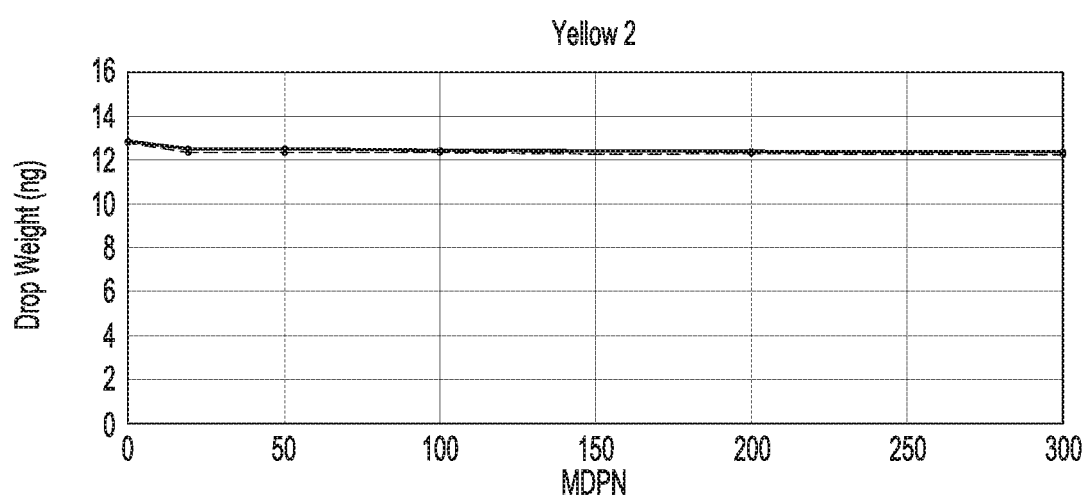

The average drop velocity and average drop weight results for the comparative yellow ink is shown in FIGS. 16A and 16B, respectively. The average drop velocity and average drop weight results for yellow 1 are shown in FIGS. 17A and 17B and for yellow 2 are shown in FIGS. 18A and 18B. Comparing the results for comparative yellow ink (FIGS. 16A and 16B) with yellow inks 1 and 2 (FIGS. 17A and 17B and FIGS. 18A and 18B), both drop velocity and drop weight were slightly improved for yellow inks 1 and 2, which included the lower amounts of glycerol or glycerol and ethoxylated glycerol.

Overall, the lower solvent content of the colored inks 1 and the colored inks 2 led to significant printhead performance improvements compared to the comparative inks with higher solvent content. The results for the comparative inks indicate that higher solvent levels render it difficult to sustain longer printhead lives.

It is noted that other comparative inks were tested at 20 wt % glycerol or glycerol and ethoxylated glycerol, with different dye loadings. While the results are not shown, the dye loading had a minimal effect on the printhead performance over the life.

It is to be understood that the ranges provided herein include the stated range and any value or sub-range within the stated range. For example, a range from about 9 wt % to about 16 wt % should be interpreted to include not only the explicitly recited limits of from about 9 wt % to about 16 wt %, but also to include individual values, such as 11 wt %, 12.5 wt %, 13 wt %, 15.8 wt %, etc., and sub-ranges, such as from about 10 wt % to about 15 wt %, from about 12 wt % to about 16 wt %, from about 11 wt % to about 14 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:
1. A thermal inkjet dye sublimation ink, consisting of:
   a disperse dye in a colorant dispersion present in an amount ranging from about 1 wt % actives to about 7 wt % actives based on a total weight of the ink;
   a co-solvent system present in a total amount ranging from about 12 wt % to about 25 wt % based on the total weight of the ink, the co-solvent system consisting of:

glycerol present in an amount ranging from about 9 wt % to about 16 wt % based on the total weight of the ink;
ethoxylated glycerol present in an amount ranging from 0 wt % to about 5 wt % based on the total weight of the ink; and
a water soluble or water miscible organic solvent present in an amount ranging from 0 wt % to about 7 wt % based on the total weight of the ink;
an additive selected from the group consisting of a surfactant, a chelating agent, a buffer, a biocide, and combinations thereof; and
a balance of water.

2. The thermal inkjet dye sublimation ink as defined in claim 1 wherein the water soluble or water miscible organic solvent is selected from the group consisting of 2-pyrrolidone, propylene glycol, dipropylene glycol, 1,2-hexanediol, 1,2-propanediol, 1,3-propanediol, 2-methyl-1,3-propanediol, tetrahydrofuran, diethylene glycol, and combinations thereof.

3. The thermal inkjet dye sublimation ink as defined in claim 2 wherein at least a portion of the water soluble or water miscible organic solvent is present in the colorant dispersion.

4. The thermal inkjet dye sublimation ink as defined in claim 1 wherein:
the glycerol is present in an amount of about 12 wt % based on the total weight of the ink; and
the ethoxylated glycerol is present in an amount of about 4 wt % based on the total weight of the ink.

5. The thermal inkjet dye sublimation ink as defined in claim 1 wherein the co-solvent system consists of:
the glycerol present in an amount ranging from about 12 wt % to about 16 wt % based on the total weight of the ink; and
the water soluble or water miscible organic solvent.

6. The thermal inkjet dye sublimation ink as defined in claim 1 wherein:
the glycerol is present in an amount of about 9 wt % based on the total weight of the ink; and
the ethoxylated glycerol is present in an amount of about 3 wt % based on the total weight of the ink.

7. The thermal inkjet dye sublimation ink as defined in claim 1 wherein the surfactant is oleth-3-phosphate, ethoxylated 2,4,7,9-tetramethyl 5 decyn-4,7-diol, or combinations thereof.

8. The thermal inkjet dye sublimation ink as defined in claim 1 wherein the chelating agent is selected from the group consisting of methylglycinediacetic acid, trisodium salt; 4,5-dihydroxy-1,3-benzenedisulfonic acid disodium salt monohydrate; ethylenediaminetetraacetic acid; hexamethylenediamine tetra(methylene phosphonic acid), potassium salt; and combinations thereof.

9. The thermal inkjet dye sublimation ink as defined in claim 1 wherein:
the ink is a black ink or a magenta ink;
the chelating agent is present in an amount greater than 0 wt % actives and less than 0.1 wt % actives based on the total weight of the ink; and
the surfactant is a combination of oleth-3-phosphate and ethoxylated 2,4,7,9-tetramethyl 5 decyn-4,7-diol.

10. The thermal inkjet dye sublimation ink as defined in claim 1 wherein:
the ink is a cyan ink or a yellow ink;
the chelating agent is present in an amount greater than 0 wt % actives and less than 0.1 wt % actives based on the total weight of the ink; and
the surfactant is ethoxylated 2,4,7,9-tetramethyl 5 decyn-4,7-diol.

11. A printing method, comprising:
selecting a dye sublimation ink, including:
a disperse dye in a colorant dispersion present in an amount ranging from about 1 wt % actives to about 7 wt % actives based on a total weight of the ink;
a co-solvent system present in a total amount ranging from about 12 wt % to about 25 wt % based on the total weight of the ink, the co-solvent system consisting of:
glycerol present in an amount ranging from about 9 wt % to about 16 wt % based on the total weight of the ink;
ethoxylated glycerol present in an amount ranging from 0 wt % to about 5 wt % based on the total weight of the ink; and
a water soluble or water miscible organic solvent present in an amount ranging from 0 wt % to about 7 wt % based on the total weight of the ink;
an additive selected from the group consisting of a surfactant, a chelating agent, a buffer, a biocide, and combinations thereof; and
a balance of water; and
thermal inkjet printing, from a thermal inkjet printhead, the dye sublimation ink:
i) directly onto a textile fabric to form an image; or
ii) onto a transfer medium to form an image on the transfer medium; and
transferring the image from the transfer medium onto a textile substrate.

12. The printing method as defined in claim 11 wherein the thermal inkjet printing involves applying to a heating resistor of the thermal inkjet printhead an operating energy that includes a margin over a turn-on energy (TOE) for the printhead, wherein the margin ranges from about 10% to about 25% over the TOE.

13. The printing method as defined in claim 12, further comprising exposing the image to a post-treatment process involving heat ranging from about 182° C. to about 215° C., and pressure ranging from 0 psi to about 100 psi.

14. A method for improving thermal inkjet printing performance of a dye sublimation ink, comprising:
selecting a co-solvent system including glycerol and ethoxylated glycerol; and
incorporating the selected co-solvent system into the dye sublimation ink, including:
a disperse dye in a colorant dispersion present in an amount ranging from about 1 wt % actives to about 7 wt % actives based on a total weight of the ink;
a water soluble or water miscible organic solvent present in an amount ranging from 0 wt % to about 7 wt % based on the total weight of the ink;
an additive selected from the group consisting of a surfactant, a chelating agent, a buffer, a biocide, and combinations thereof; and
water; and
wherein the incorporating involves:
adding the glycerol in an amount ranging from about 9 wt % to about 16 wt % based on the total weight of the ink; and
adding the ethoxylated glycerol in an amount ranging from 0 wt % to about 5 wt % based on a total weight of the ink.

15. The method as defined in claim 14 wherein the disperse dye in the colorant dispersion is more soluble in the water soluble or water miscible solvent than in the glycerol.

\* \* \* \* \*